Jan. 18, 1938. F. A. FRITZSCH 2,105,913
LATHE
Filed July 17, 1935 11 Sheets-Sheet 7
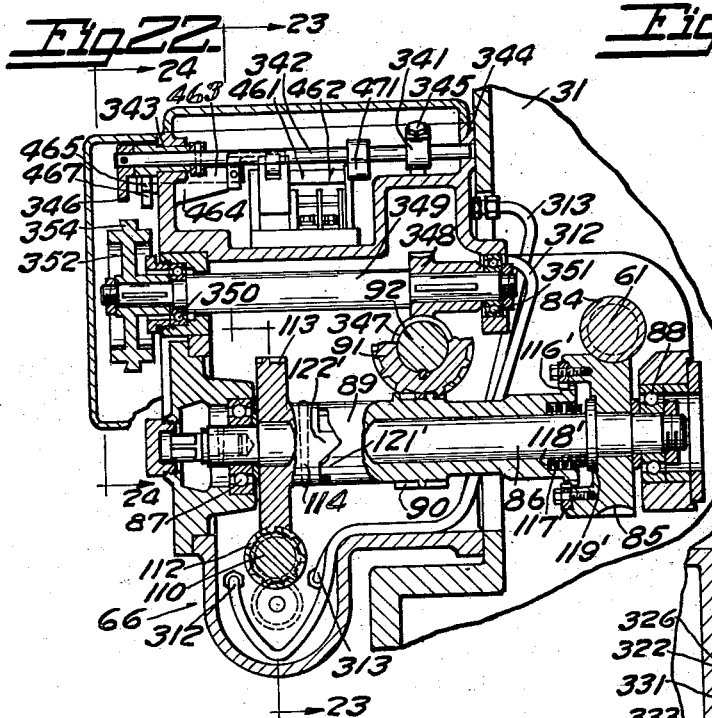
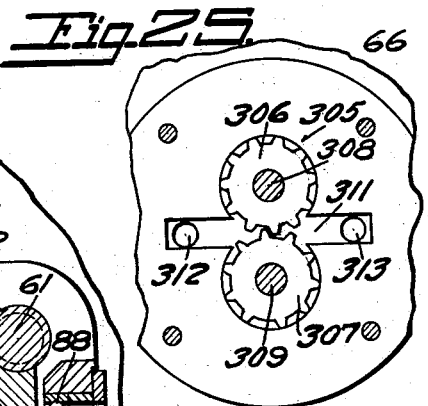
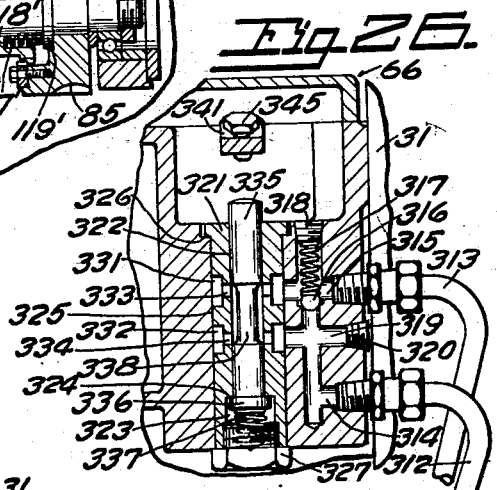
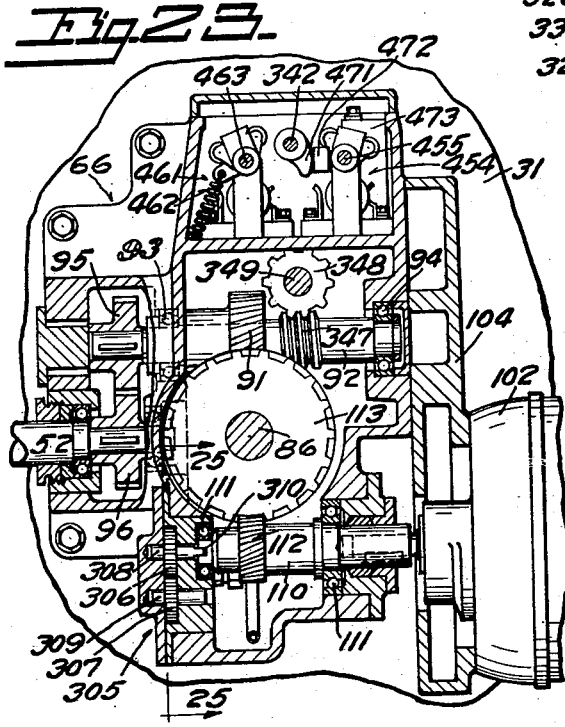
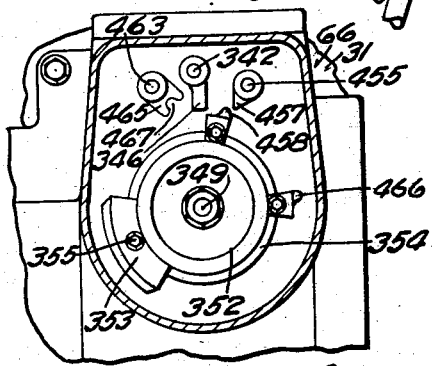
INVENTOR:

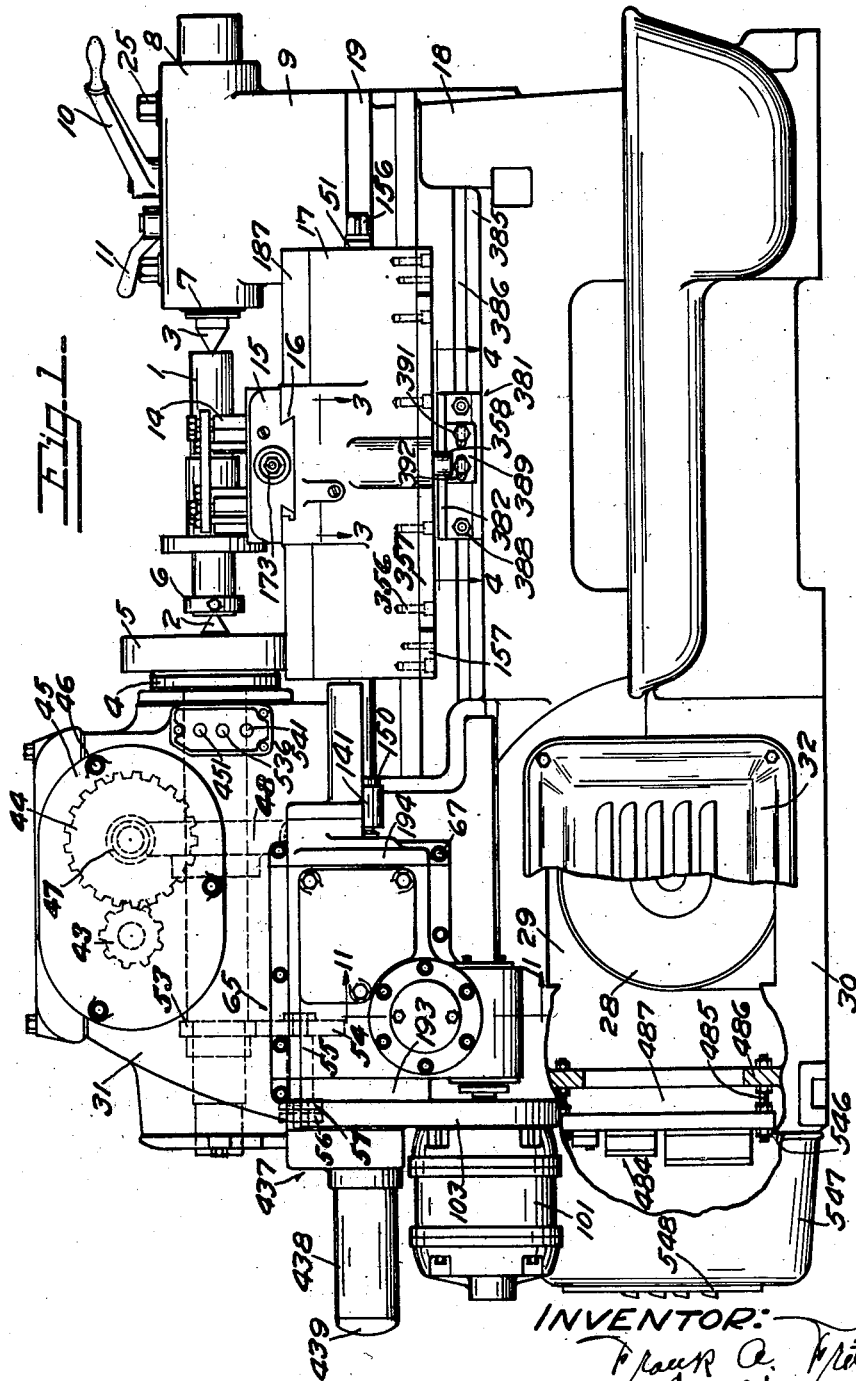

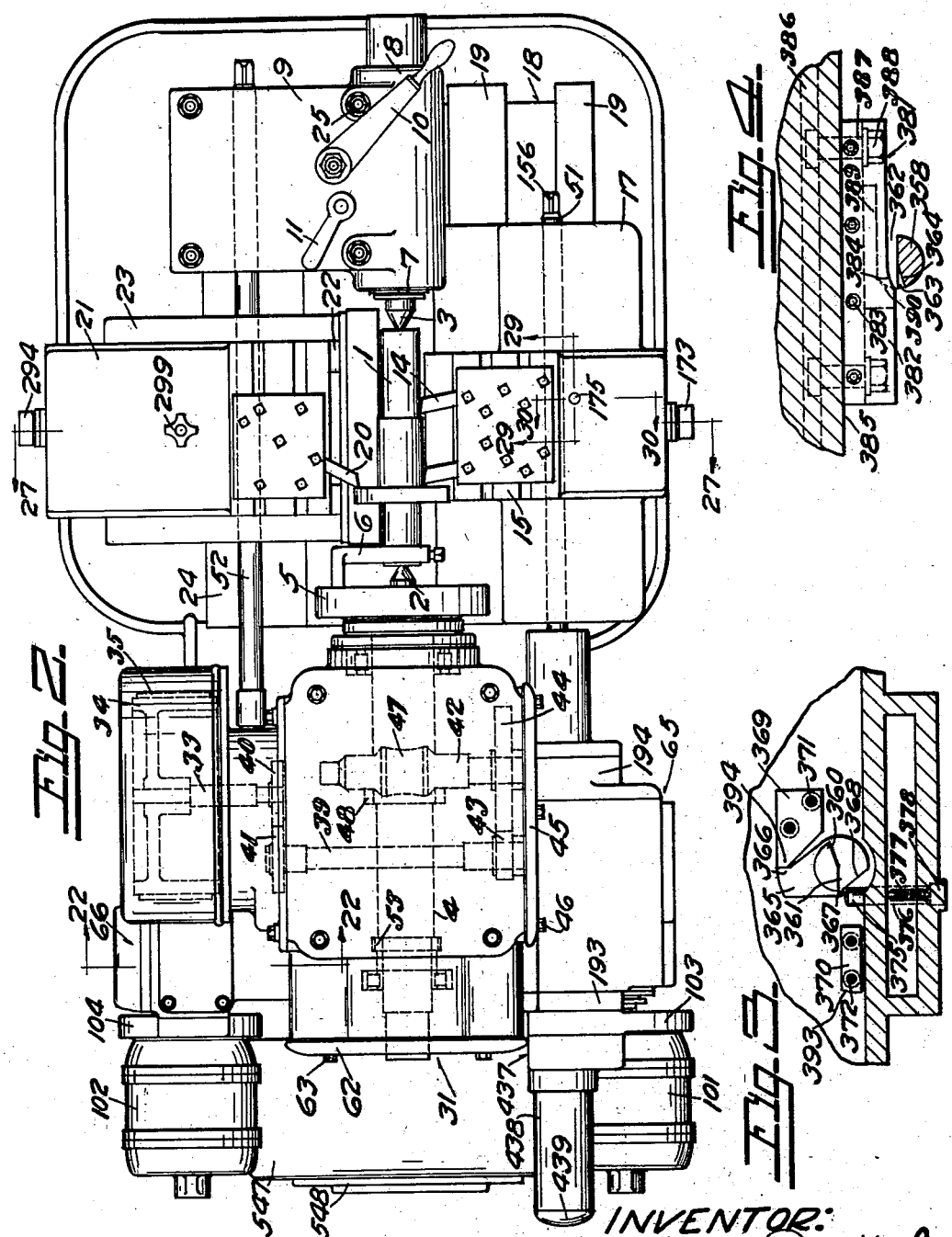

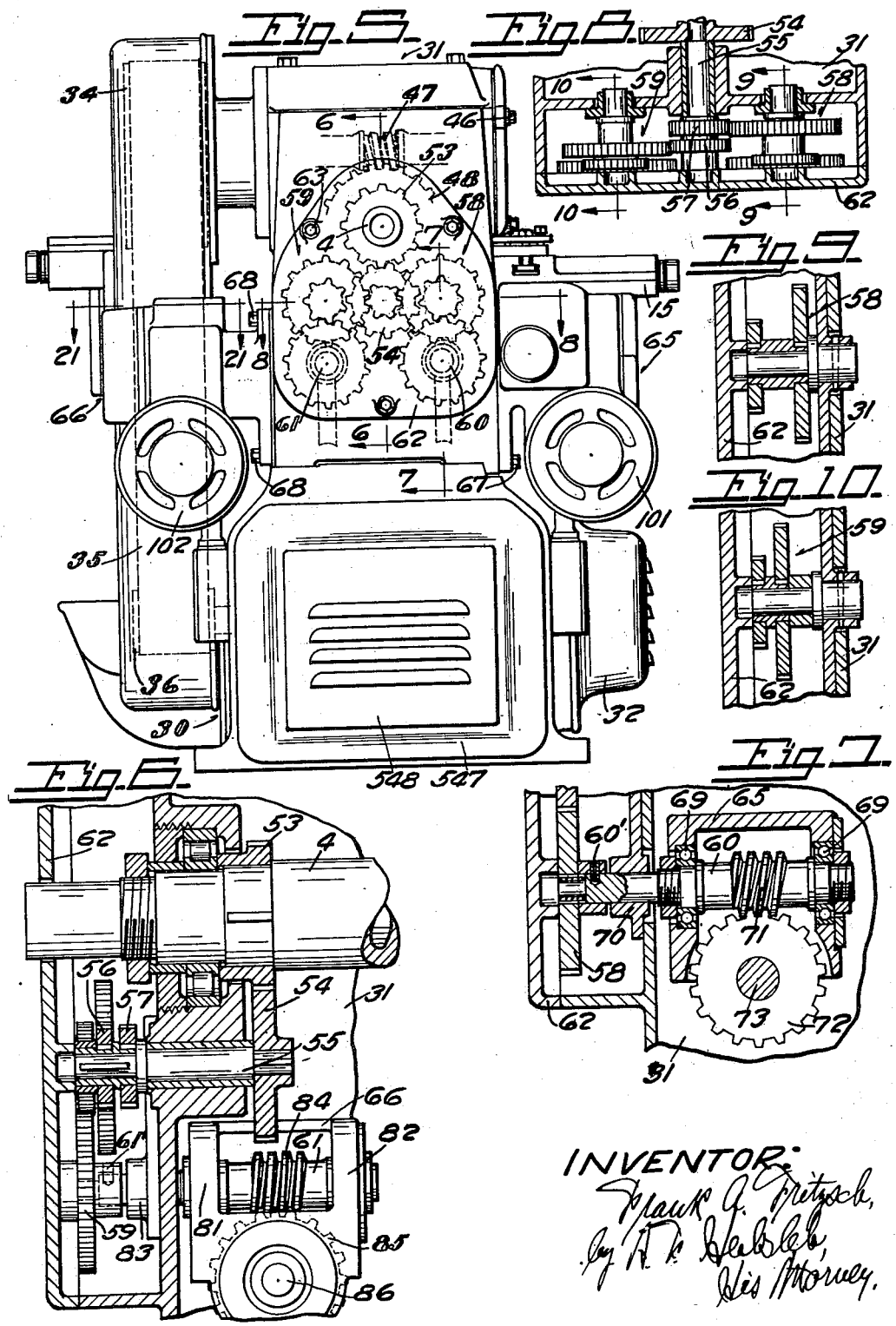
Jan. 18, 1938.     F. A. FRITZSCH     2,105,913
LATHE
Filed July 17, 1935     11 Sheets-Sheet 3

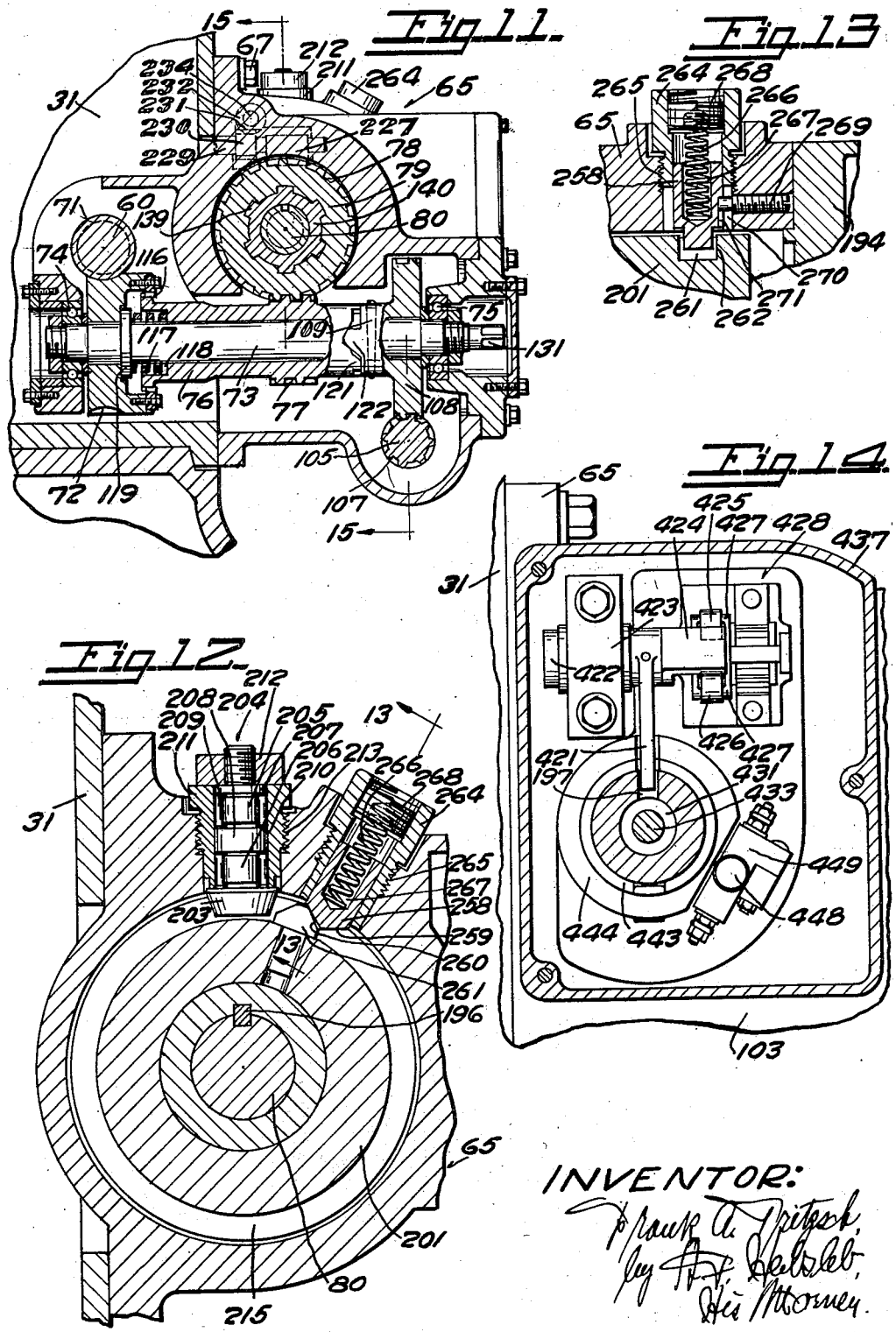

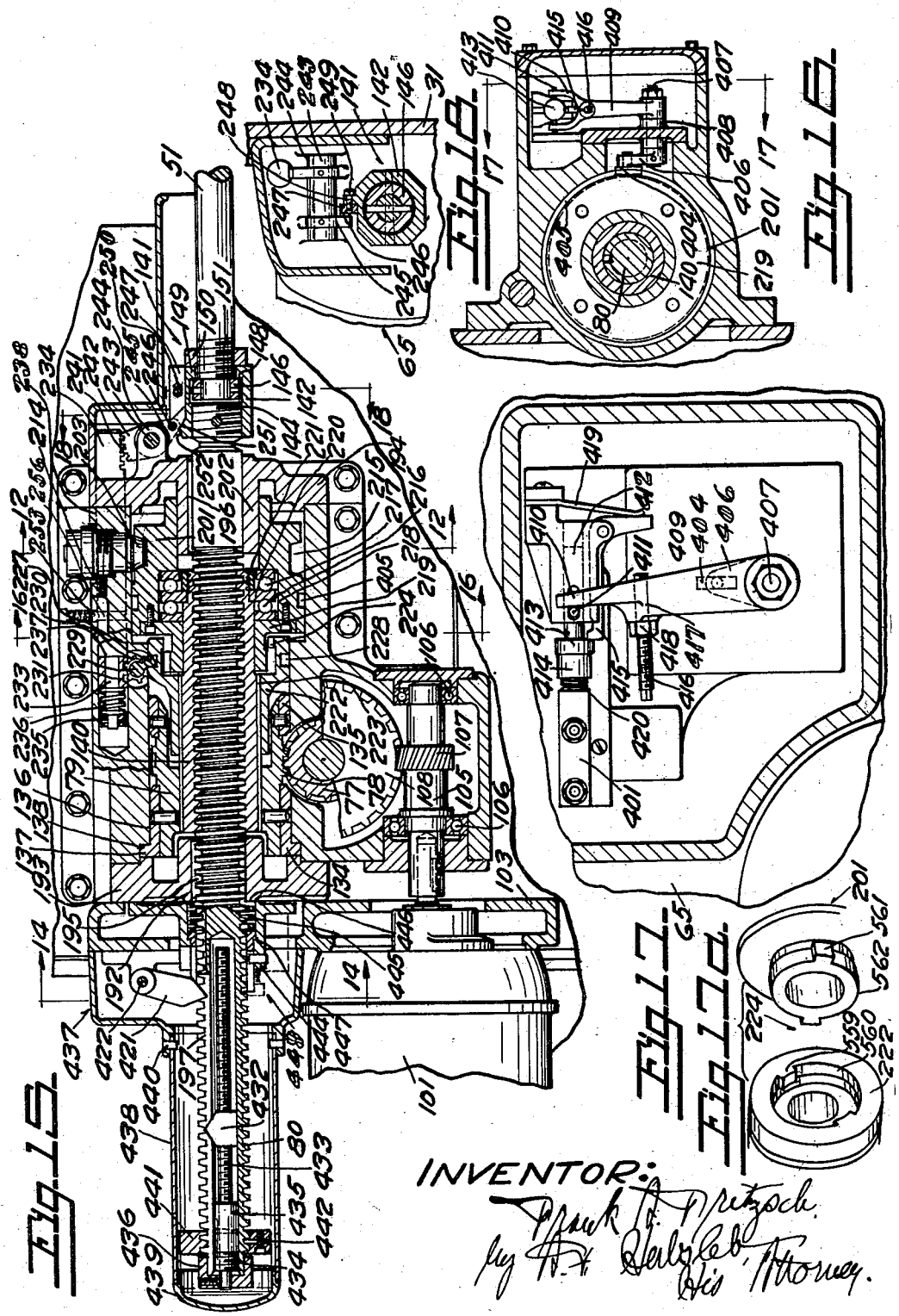

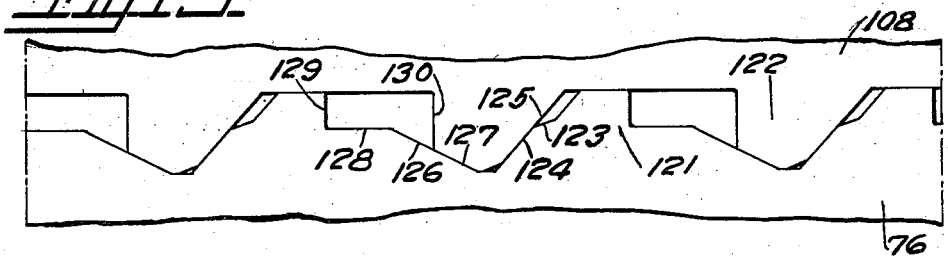
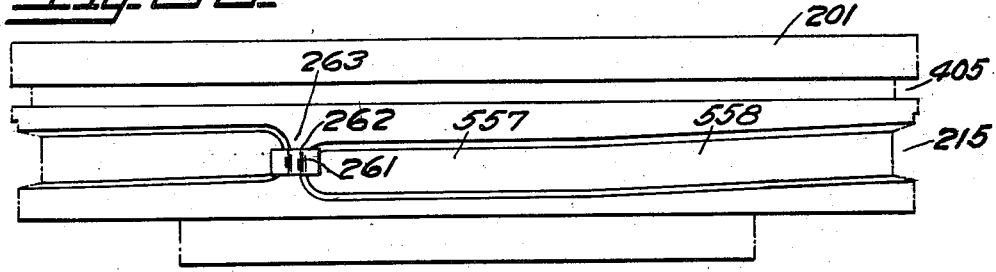
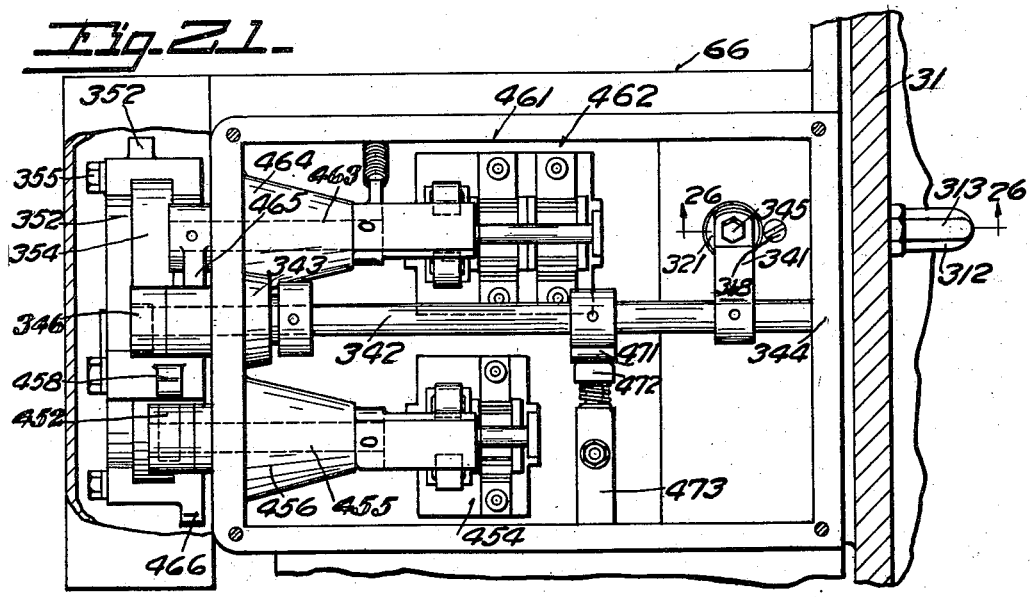

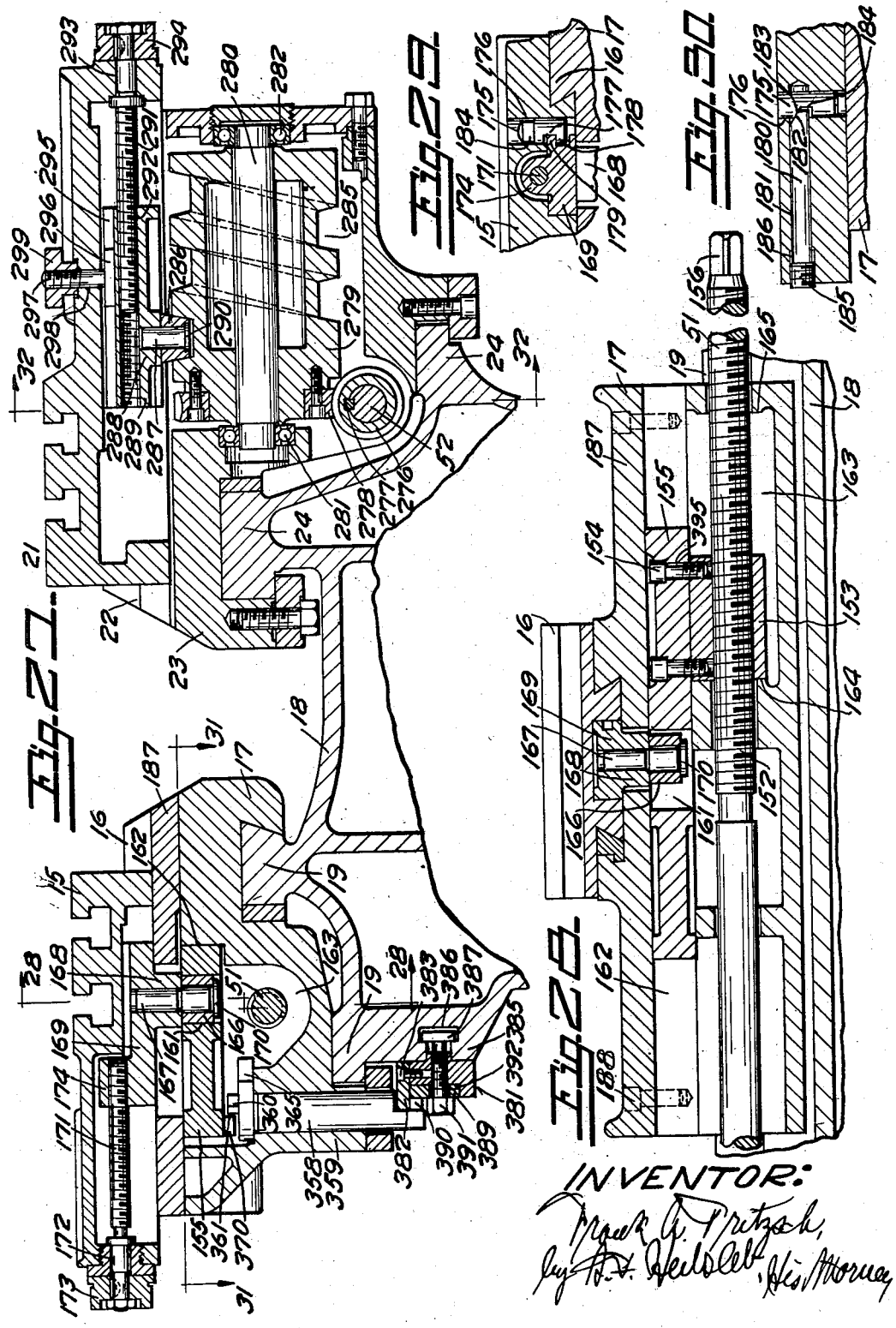

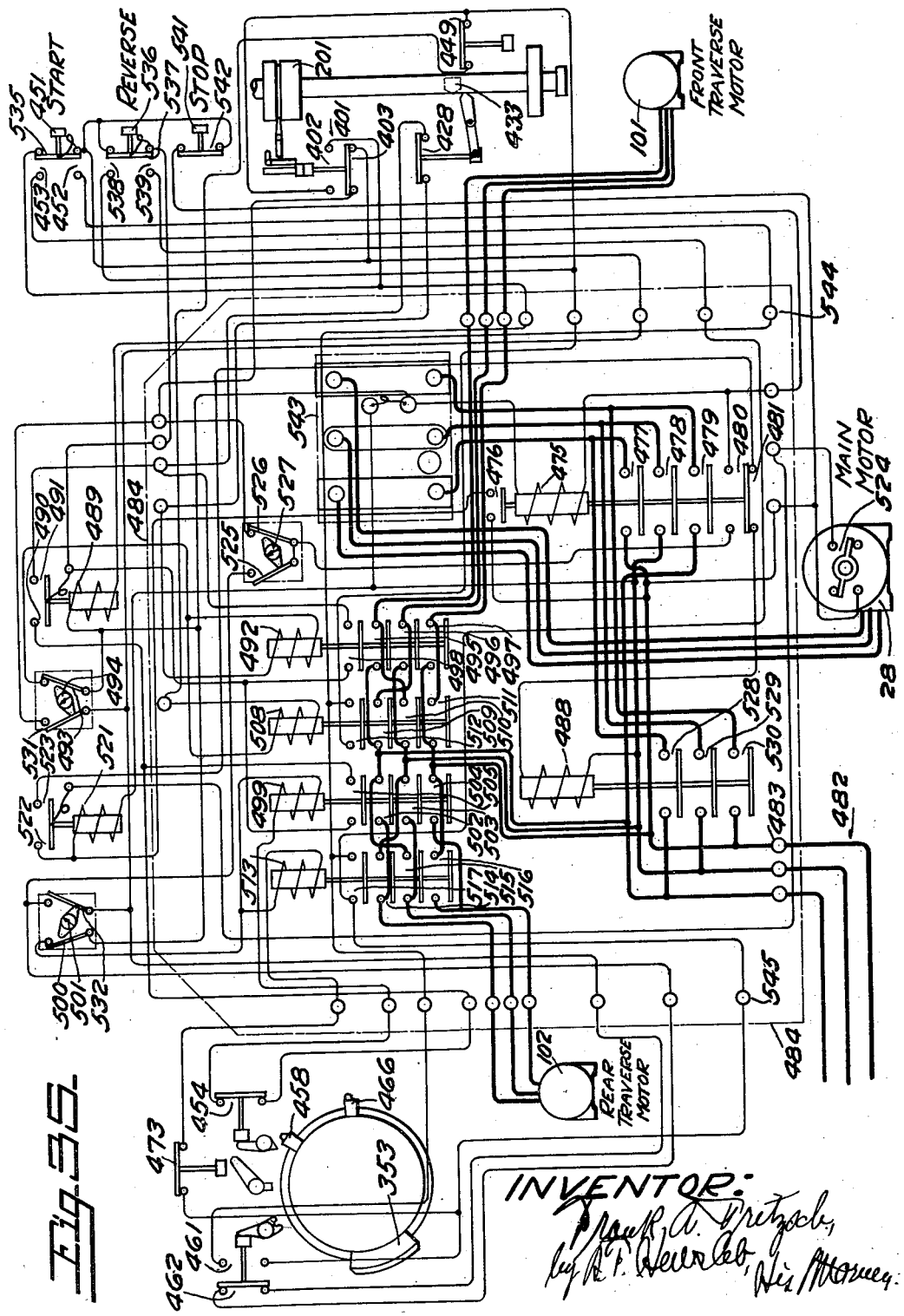

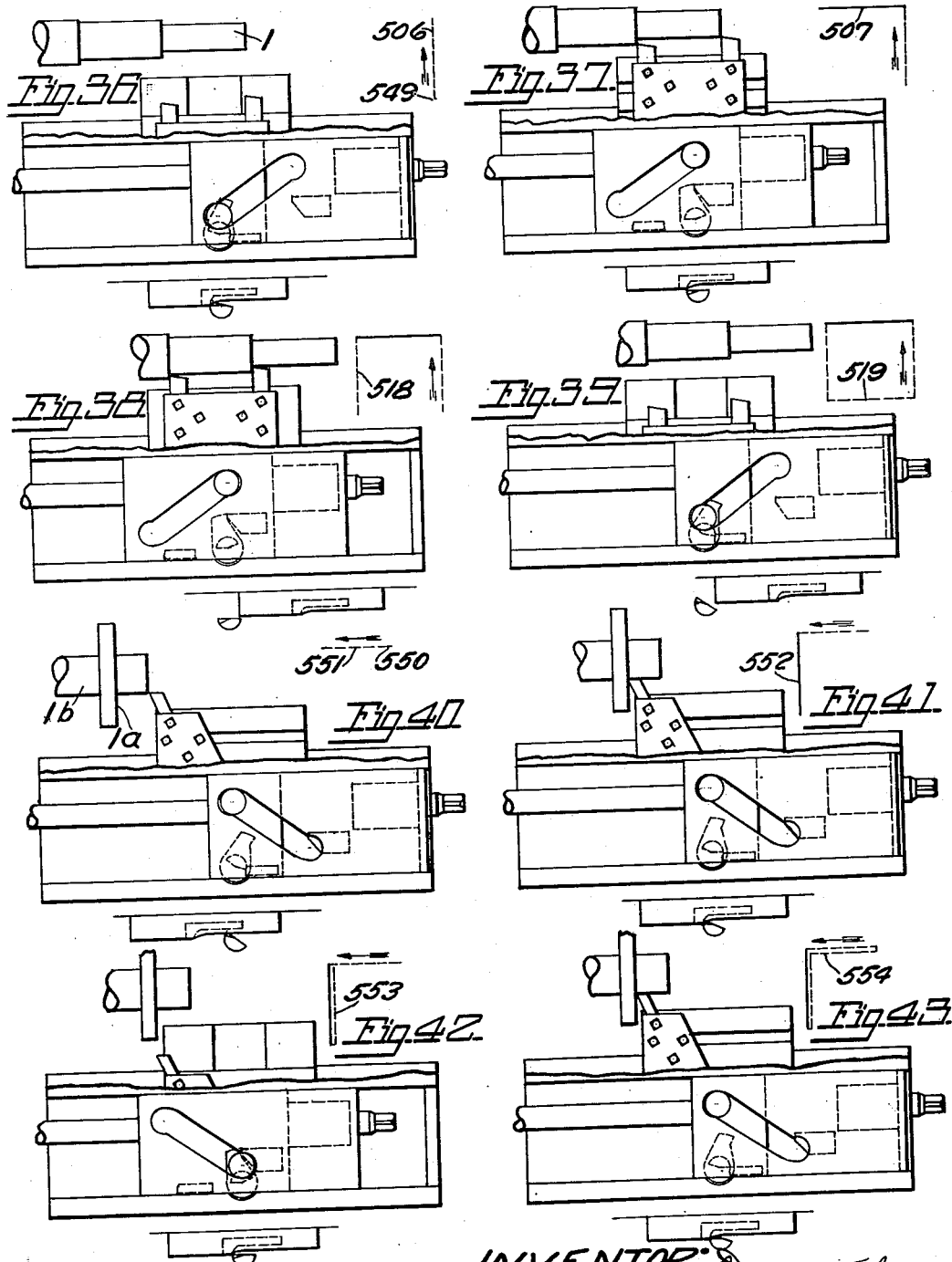

Patented Jan. 18, 1938

2,105,913

UNITED STATES PATENT OFFICE 2,105,913

LATHE

Frank A. Fritzsch, Cincinnati, Ohio, assignor to The Lodge & Shipley Machine Tool Company, Cincinnati, Ohio, a corporation of Ohio Application July 17, 1935, Serial No. 31,855

33 Claims. (Cl. 82—21)

My invention relates to a metal cutting machine employing a work support and a tool support having movement therebetween for the cutting operation, and is exemplified as of the lathe type, wherein the movements of a cutting tool or cutting tools are automatically controlled for operation selectively or in unison, and wherein the work may be selectively operated upon from relatively opposite sides by cutting tools arranged either singly or in gangs. The term metal includes similar and substitute materials.

It is the object of my invention to provide a machine of this character embodying simple control and operating means for providing a cycle or cycles of movements of a cutting tool or cutting tools; further, to control the paths of relatively movable cutting tools in timed relation to one another; and, further, to provide non-interfering relations between the controls for the cutting tools at the opposite sides of the work, and for operating the various mechanisms in proper sequence and in selected directions and paths for providing a multitude of cutting cycles.

It is the object of my invention, further, to provide novel electrical control means for various automatic changes in movement of the cutting tool or cutting tools; and, further, to provide novel means for exactitude of the diameters and shoulders produced on work pieces.

My invention consists in novel means for accomplishing these various objects; further, in providing novel means of placing the movements of the cutting tool or cutting tools in consonance with the rotations of the spindle rotating the work while the cutting operation or operations are being performed, and of quick traversing the cutting tool or cutting tools for rapidity of return or idle movements of the tool or tools; and, further, in automatically controlling such movements by electrical devices in novel manner.

My invention consists, further, in automatically placing the cutting tool or tools in train with an independent electric motor or motors for quick traverse idle movements of the tool or tools; further, in providing a separate reversible electric motor or motors for such quick traverse movements; and, further, in providing novel means for transition between spindle drive for feed movements of the cutting tool or tools, and quick, rapid traverse drive for the idle movements of the cutting tool or cutting tools, and novel control means for the same.

My invention consists, further, in novel means controlling the relations of carriage and tool slide movements, and in novel related spindle drive and independent quick traverse drive for the carriage and tool slide; and, further, in novel control means for controlling the related actuations between a plurality of the same.

My invention is exemplified as employed in a so-called automatic lathe in which there are carriages and tool slides at the opposite sides of the rotating work piece for cutting opposite sides of the work during the location of the work in the machine.

The work may be suitably supported between centers or on a face plate or by a suitable fixture or fixtures and be grasped in suitable manner so as to rotate at a desired cutting speed.

The invention will be further readily understood from the following description and claims, and from the drawings, in which latter:

Fig. 1 is a side elevation of my improved device, partly broken away.

Fig. 2 is a plan view of the same.

Fig. 3 is a cross-section of a detail of carriage latching means, taken on the line 3—3 of Fig. 1.

Fig. 4 is a cross-section of the same, taken on the line 4—4 of Fig. 1.

Fig. 5 is a head end elevation of my improved device.

Fig. 6 is a vertical longitudinal section of a detail of the driving mechanism from the spindle to the rear tool actuating means, taken on the line 6—6 of Fig. 5.

Fig. 7 is a vertical longitudinal section of a detail of driving mechanism between the spindle and the front tool actuating means, taken on the line 7—7 of Fig. 5.

Fig. 8 is a horizontal longitudinal section of a detail of driving mechanism between the spindle and the respective tool actuating means, taken on the line 8—8 of Fig. 5.

Fig. 9 is a vertical longitudinal section of a detail of the same, taken on the line 9—9 of Fig. 8.

Fig. 10 is a vertical longitudinal sectional detail of the same, taken on the line 10—10 of Fig. 8.

Fig. 11 is a vertical cross-section, taken on the line 11—11 of Fig. 1, partly broken away, showing the related feed and quick traverse driving means for the front tool support.

Fig. 12 is a cross-section, taken in the plane of the line 12—12 of Fig. 15, showing the dwell mechanism for the end of the feeding movement of the front tool support.

Fig. 13 is a cross-section of the same, taken on the line 13—13 of Fig. 12.

Fig. 14 is a cross-section, taken in the plane of the line 14—14 of Fig. 15, partly broken away, showing quick traverse control switches for the front tool support.

Fig. 15 is a longitudinal section, taken in the plane of the irregular line 15—15 of Fig. 11, partly broken away, showing the driving and control mechanism in the front control box.

Fig. 16 is a cross-section of a detail of the same, taken in the plane of the line 16—16 of Fig. 15, showing the reversing control for the quick traverse motor.

Fig. 17 is a cross-section of the same, taken in the plane of the line 17—17 of Fig. 16.

Fig. 17a is a perspective view of the clutch between the nut and the cam sleeve.

Fig. 18 is a cross-section, taken in the plane of the irregular line 18—18 of Fig. 15, showing a detail of the control for the dwell and reversing mechanism.

Fig. 19 is a developed plan view of the driving cam between the respective quick traverse motors and the operating shafts for the respective tool supports.

Fig. 20 is a developed plan view of the dwell cam for control of the final portion of feeding movement of the front tool.

Fig. 21 is a plan section of the rear control box, taken on the line 21—21 of Fig. 5, and partly broken away.

Fig. 22 is a vertical cross-section of the rear control box mechanism, taken on the line 22—22 of Fig. 2, and partly broken away.

Fig. 23 is a longitudinal section of the same, taken in the plane of the line 23—23 of Fig. 22, and partly broken away.

Fig. 24 is a section in the plane of the line 24—24 of Fig. 22, showing the switch operating drum for the rear transverse motor.

Fig. 25 is a cross-section of a detail of the fluid brake pump for arresting coasting of the rear tool support at the end of its reverse traverse movement, taken on the line 25—25 of Fig. 23.

Fig. 26 is an axial section of the fluid control valve for the fluid pump, taken on the line 26—26 of Fig. 21, and partly broken away.

Fig. 27 is a vertical cross-section, taken on the line 27—27 of Fig. 2, and partly broken away, showing the front and rear carriages and tool slides and their mountings.

Fig. 28 is a vertical longitudinal section of front carriage mechanism, taken in the plane of the irregular line 28—28 of Fig. 27, and partly broken away.

Fig. 29 is a detail of the front tool slide clamp, taken on the line 29—29 of Fig. 2.

Fig. 30 is a cross-section of the same, taken on the line 30—30 of Fig. 2.

Fig. 35 is a diagrammatic representation of the controls for the various tool actuations, and the electric devices therefor.

Figure 31:
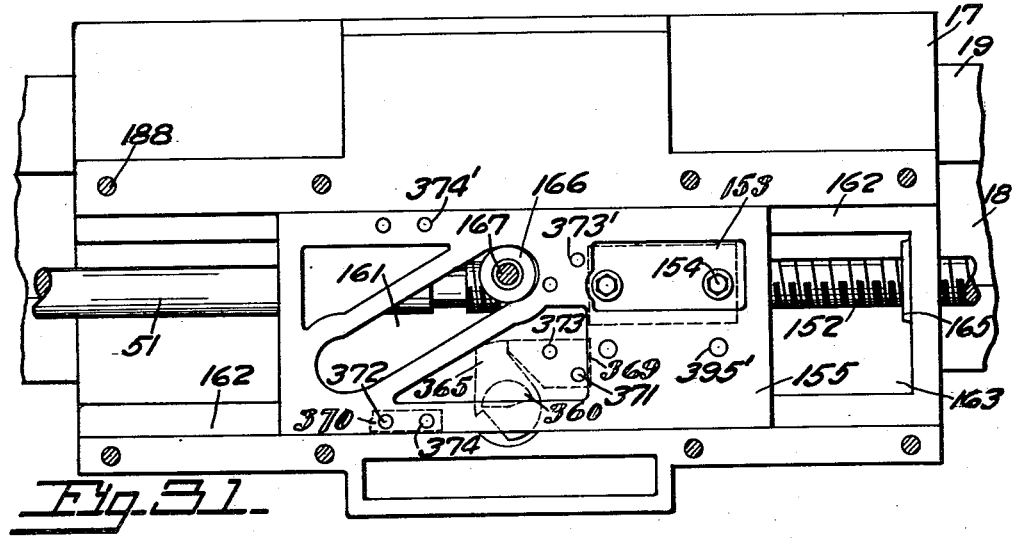
Fig. 31 is a horizontal section of the front carriage, partly broken away, taken in the plane of the line 31—31 of Fig. 27.
Figure 32:
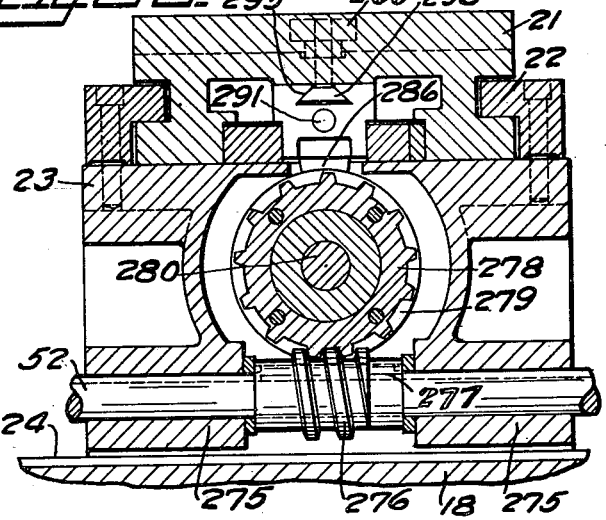
Fig. 32 is a cross-section of the rear carriage, taken in the plane of the line 32—32 of Fig. 27, and partly broken away.

Figs. 36 to 39 inclusive are diagrammatic representations showing tool positions in different paths of a turning cycle; and, Figs. 40 to 43 inclusive are diagrammatic representations showing tool positions in different paths of a facing cycle.

In the present exemplification of my invention a piece of work 1 (Figs. 1 and 2) is supported between a head center 2 and a tail center 3. The head center is in a drive spindle 4, having a face plate 5, with which the work rotates, being connected therewith by a suitable dog 6. The tail center is in a tail spindle 7 slidable endwise in a bearing 8 in a tail stock 9, for attachment and release of the work, as by a handle 10, having usual rack and pinion connection with the sleeve, the sleeve being clamped in the bearing by usual clamping means operated by a handle 11.

The work is operated upon by suitable tools exemplified as a front tool or tools 14 (Figs. 1 and 2) suitably clamped to a front tool slide 15, movable toward and from the work along guideways 16 of a front carriage 17, slidable lengthwise of the bed 18 of the machine on guideways 19, and by a rear tool or tools 20 suitably clamped to a rear tool slide 21 movable toward and from the work on guideways 22 of a rear carriage 23, movable lengthwise of the bed on guideways 24. The tail stock is also adjustable lengthwise of the bed on these guideways, and is arranged to be clamped in adjusted positions by suitable clamping means clamped by clamping nuts 25. The respective tool slides and the carriages form tool supports, either individually or collectively.

The head spindle 4 is suitably rotated at selective speeds, shown accomplished by a main electric motor 28 (Figs. 1, 2 and 5) mounted in a compartment 29 in the base 30 of the machine under the head stock 31. A releasable louvre plate 32 closes the front end of this compartment. A cross shaft 33 is journaled in the head stock and has a pulley 34 thereon, a belt 35 being received over this pulley and a pulley 36 on the rotor of the motor for driving the cross shaft.

A further cross shaft 39 is journaled in the head stock, (Figs. 1, 2 and 5), meshing gears 40, 41 connecting the cross shafts. Another cross shaft 42 is journaled in the head stock, speed changing gears 43, 44 connecting this cross shaft with the cross shaft 39. These speed changing gears may have others of different gear ratios substituted therefor for rotating the spindle at desired speed. A closing plate 45, releasably secured to the head stock by bolts 46, holds the change gears on their respective shafts. A worm 47 on the cross shaft 42 meshes with a worm wheel 48 fixed to the spindle for rotating the spindle.

Shafts 51, 52 extend lengthwise of the bed for moving the tool supports respectively at the front and rear of the bed. Feeding movements are imparted to these shafts for moving the respective tool supports at various speeds which have definite relations to the speed of rotation of the head stock spindle or work rotating means, accomplished by trains of gearing, including speed change gearing, and operatively connected with the work rotating means for consonance of tool feed with work rotation.

Thus the head stock spindle has a gear 53 fixed thereto, (Figs. 1, 2, 5, 6, 7 and 8), which meshes with a gear 54 fixed on a shaft 55 journaled in the head stock, and having change pinions 56, 57 thereon for driving two trains of speed change gearings 58, 59 for respectively driving a front shaft 60 having driving connection with the front tool actuating shaft 51 and a rear shaft 61 having driving connection with the rear tool actuating shaft 52, for feeding actuations of said shafts at various speeds. A shear pin 60′ is between the gearing 58 and the shaft 60, and a shear pin 61' is between the gearing 59 and the shaft 61 for safety. A cover plate 62 releasably secured to the end of the frame by bolts 63 retains said speed change gears on their respective shafts.

Means are also provided for imparting quick traverse movements to said shafts 51 and 52, and for selectively imparting said feeding movements and said quick traverse movements, the latter in forward as well as reverse direction.

These means are shown located in control boxes 65, 66 respectively at the front and at the rear of the head end of the machine. The control boxes are suitably secured as by bolts 67, 68 to the respective sides of the head stock.

The front shaft 60 is journaled in bearings 69 in the front control box and in a bearing 70 in the head stock. It has a worm 71 thereon, which meshes with a worm-wheel 72, rotating loosely on a cross-shaft 73 (Figs. 7 and 11) journaled in bearings 74, 75 in the front control box.

A longitudinally movable sleeve 76 (Figs. 11 and 15) is on this shaft and has a spiral gear 77 thereon, which meshes with a spiral gear 78 on a sleeve 79, which has operative connection with a lengthwise actuating shaft 80, coupled to the tool actuating shaft 51, which is an extension thereof.

The rear shaft 61 is journaled in bearings 81, 82 in the frame of the rear control box and a bearing 83 of the head stock. (Fig. 6). It has a worm 84 thereon, which meshes with a worm-wheel 85 (Figs. 6 and 22), rotatively loose on a cross shaft 86, journaled in bearings 87, 88 of the rear control box. This shaft has a longitudinally movable sleeve 89 thereon, having thereon a spiral gear 90 meshing with a spiral gear 91, on a shaft 92, extending lengthwise of the machine and journaled in bearings 93, 94 (Fig. 23) of the rear control box. Meshing gears 95, 96 are on this shaft and on the tool actuating shaft 52, which is in effect an extension of the shaft 92.

Each of the shafts 73, 86 has means mounted thereon, (Figs. 11 and 22), including the respective longitudinally movable sleeves 76, 89 for rendering the spindle drive or the quick traverse drive effective upon the respective actuating shafts 51, 52, these means being similar. The device for actuating the shaft 51 is described and that for the shaft 52 has its parts designated by similar but primed reference numerals.

Separate reversible quick traverse electric motors 101, 102 are provided (Figs. 1, 2, 5, 15 and 23) for quick traversing the respective front and rear tool supports. They are suitably bolted to brackets 103, 104, respectively secured to the outer end plates of the respective control boxes. The rotor of the quick traverse electric motor 101 is secured to a shaft 105 journaled in bearings 106 of the control box 65 and has a spiral pinion 107 thereon, which meshes with a spiral gear 108 fixed, as by a pin 109, (Fig. 11), to the shaft 73.

The rotor of the rear quick traverse motor 102 (Figs. 22 and 23) is connected with a shaft 110 journaled in bearings 111 of the control box 66 and having a spiral pinion 112 thereon, which meshes with a spiral gear 113 fixed, as by a pin 114, to the shaft 86.

There are connecting means (Fig. 11) between the gear 72 and the longitudinally movable sleeve 76 shown as a clutch 116 comprising internal teeth on the gear 72 and outer peripheral teeth on the slidable sleeve. Lengthwise sliding of the sleeve in one direction disengages the clutch, and sliding movement of the sleeve in the opposite direction engages the clutch. A spring 117 in a socket 118 of the lengthwise movable sleeve between a flange 119 on the shaft 73 and the bottom of said socket tends normally to engage said clutch.

Automatic releasing means are provided for the clutch under the influence of the quick traverse motor. The automatic releasing means are actuated by a preponderance of motion of the quick traverse motor over the motion imparted by the feeding train from the spindle. These releasing means are shown as comprising coacting cam teeth 121, 122 (Figs. 11 and 19), respectively on proximate ends of the lengthwise movable sleeve 15 and the hub of the gear 108.

When motion is to be transmitted from the feed gearing through the clutch and longitudinally movable sleeve, (Figs. 11 and 19), the quick traverse motor is inactive, its rotor being rotated idly by means of the cam teeth, and the gears 107, 108, without lengthwise movements of the sleeve 76 to disengage the clutch.

When, however, motion is transmitted from the quick traverse motor, positive rotation is imparted to the gear 108 and the shaft 73, in either direction, which causes rotation of the cam teeth on the gear 108 either at greater speed than the speed of rotation of the cam teeth on the sleeve 76 imparted by the feed gearing from the spindle, or reverse to said last-named rotation, resulting in angular movement between the respective cam teeth, with the result that lengthwise movement is imparted to the sleeve 76 by a climbing between the cams, thereby disengaging the clutch 116 and rotating the sleeve 76 at the speed imparted by the quick traverse motor in either direction and unqualified by the feed gearing.

There is a slight offset 123 in the engaging faces 124, 125 of the cam teeth. (Figs. 11 and 19.) These engaging faces which coact when the quick traverse motor is rotating in forward traverse direction, in which direction of rotation the gears 72, 108, driven respectively by the feed gearing and the quick traverse motor, are rotating in the same direction, the gear 108, however, rotating at a greater speed than the gear 72. During such rotations of the gears the engaging faces act as cams for disengaging the clutch 116, and the ends of the teeth of the cam on the gear 108 rest in the offsets 123, forming a stop to hold the sleeve in longitudinally moved position for aiding in maintaining release of the clutch 116. The longitudinal movement of the sleeve 76 is limited by engagement of its clutch end with the flange 119 while the cam teeth are still in engagement for rotating the sleeve, the sleeve rotating with the shaft 73.

As soon, however, as the quick traverse motor is deenergized and the gear 108 ceases to be rotated thereby, the end wall of this offset, which is a camlike structure, is released from the tooth in engagement therewith for reverse lengthwise movement of the sleeve 76 and re-engagement of the clutch 116 by the action of the spring 117.

The deenergizing of the quick traverse motor in forward direction takes place at the end of desired quick traverse forward movement of the tool. It is desired to continue movement of the tool in feeding direction at the end of such quick forward traverse. The transition from preponderance of quick traverse movement to slower feeding movement of the tool is caused by release movement between the engaging faces in which the offset 123 is located, resulting in immediate re-engagement of the clutch 116, for placing the tool under the feeding influence of the feed gearing.

When the quick traverse motor is rotated in reverse direction for reverse quick traverse, an opposite rotative relation between the coacting cam teeth (Figs. 11 and 19) takes place for again moving the sleeve 76 endwise and disengaging the clutch 116, reverse rotation between the gear 108 and the gear 72 taking place. Consequent reverse quick traverse movement of the tool takes place in its cycle of movements, at the end of which it is desired that movement of the tool shall cease, the cycle having been completed. For insuring such cessation of movement of the tool, re-engagement of the clutch 116 is prevented, by holding means to hold the connecting means or clutch in released or disengaged relation, as by providing the opposite engaging faces 126, 127 of the cam teeth 121, 122 (Figs. 11 and 19) with a resting face or land 128, and driving faces 129, 130, such land being shown on one of the series of teeth and such driving faces being shown on both series of teeth. The land is sufficiently wide to prevent retraction of the sleeve by the spring 117, and forms a latch for the sleeve.

When the quick traverse motor is deenergized while rotating in reverse direction, the clutch 116 remains in unclutched relation, thereby stopping all feeding and traversing movements of the tool.

The shaft 73 is provided with hand operating means, as by providing it with a polygonal end 131 for receiving a suitable wrench, employed in machine setting operations.

Similar means are provided between the gears 85, 113 and the sleeve 89 (Fig. 22), similar parts being designated by similar but primed reference numerals.

The sleeve 79 (Figs. 11 and 15) has bushings 134, 135 thereon rotatable therewith, journaled in a bore 136 in the control box 65, the bushing 134 having a radially extending annular flange 137 thereon received in a rabbet 138 surrounding said bore and shouldered in the bottom of the rabbet. The sleeve 79 has spline connection 139 with a nut 140 threaded to the lengthwise actuating shaft or screw 80. The directions of rotations of the sleeve determine the directions of movements of the tool.

The screw 80 is coupled to its extension 51 by a coupling 141 for endwise rigidity between the screw and its extension, and for permitting the extension to be rotated with relation to the screw. This coupling is exemplified as comprising a cup 142, having threaded connection with a head 144 of the screw, being pinned to said head. A collar 146 is fixed to the end of the extension, to form a shoulder 148, against which the inwardly extending flange 149 of the cup is clamped by a clamp nut 150 threaded over the threaded inner end 151 of said extension.

The extension 51 has a threaded portion 152, to form an auxiliary screw, rotatable in a nut 153 (Figs. 27, 28 and 31). The nut is fixed, as by bolts 154, to the lower face of a cam plate 155. The extension is rotatable on the screw 80 by releasing the clamp nut 150 and locating a suitable turning handle or wrench over the polygonal outer end 156 of the extension. The extension is rotated to position the carriage lengthwise of the bed, the carriage being clamped in adjusted position to the bed by clamps 157 (Fig. 1). After adjustment the clamp nut 150 is again clamped for rigidly holding the two portions of the screw or actuating shaft together in lengthwise and rotative directions.

The cam slide is provided with a cam slot 161, and it is movable lengthwise of the carriage in guideways 162 in the carriage (Figs. 27, 28 and 31). The lengthwise movement of the cam plate is determined by the limits of movement of the nut 153, which is movable in a recess 163 of the carriage between shoulders 164, 165 at the ends of said recess.

The tool slide is provided with an abutment which cooperates with the walls of the cam in the cam plate, shown as a roller 166 on a stem 167, fixed in a bearing 168 of an adjustable block 169. The roller is held in rotative relation to the stem and is held toward the adjustable block by the head 170 of said stem.

A screw 171 is journaled in a bearing 172 (Figs. 27 and 29) on the tool slide 15 and is held endwise therein, and is provided with a knob 173 by means of which this screw is manually rotated, suitable graduations being provided for the setting of the knob. The screw has threaded engagement in a threaded bearing 174 of the adjustable block 169 for adjusting the tool slide lengthwise of its guideway in the carriage.

The tool slide is clamped in adjusted position to the adjustable block by a clamp 175 (Figs. 29 and 30), movable endwise in a hole 176 in the tool slide and provided with a slot 177, forming a lip 178, the adjustable block being provided with a ledge 179 received in said slot.

And endwise movable cam bar 180 is movable endwise in a bore 181 in the tool slide and has a cam 182 thereon, which coacts with a cam 183 in a recess 184 in the endwise movable clamp 175. A threaded plug 185 is adjustable in a threaded enlargement 186 of the bore 181 for forcing the cam bar inwardly for clamping movement of the plug, to clamp the tool slide to the block in adjusted relation. The threaded plug is rotated outwardly to release the clamped relation of this clamp.

During the time that the nut 153 is moved lengthwise by the screw in the recess 163 between the abutments 164, 165, (Fig. 28), movement takes place of the cam plate and the slot therein lengthwise of the carriage. The coaction between the walls of said cam slot and the roller 166, with the carriage stationary on its ways, causes movement of the tool slide toward or from the axis of the work, depending on the direction of movement of the cam plate and the direction of inclination of the slot therein, and the contour of said slot. In practice, different cam plates having slots conforming to the work to be performed, are substituted for one another in the carriage, and are readily attached to the nut 153 by removal and reclamping of the bolts 154, and by removal and replacement of the top plate 187 of the carriage, which is releasably secured to the body of the carriage by bolts 188.

Endwise movement of the screw shaft after engagement of the cam plate with the respective abutments 164, 165, causes movement of the carriage in either direction lengthwise of the bed.

The screw 80 (Fig. 15) is movable lengthwise in bearings 192 in the end plates 193, 194 of the control box 65. Splines 195, 196 are located between these bearings and the screw to prevent rotation of the screw, these splines being received in slots in said bearings, and in a slot 197 extending lengthwise in the screw.

End thrust means are provided for the nut 140, comprising a sleeve 201, journaled about the outer periphery of the inwardly extending hub 202 of the bearing 192. The sleeve 201 is held endwise with relation to the bearing, (Figs. 12 and 15), as by means of an end thrust member 203, shown as a roller of frusto-conical form provided with a stem 204 rigid therewith and having journal portions 205, 206 and annular flanges 207, 208. Bearing rollers 209 are located about said journal portions. The flanges and bearing rollers are located in the bore 210 of a sleeve 211, the wall of the bore forming the outer bearing or runway for said bearing rollers. The upper end of the stem is threaded for receiving a nut 212 clamped against the flange 207, the sleeve being located between the roller 203 and said nut in such manner as to permit snug rotation of the roller, its stem and the nut.

The sleeve 211 has threaded connection in a bearing 213 therefor in the wall of the control box and is rotatable therein for axial adjustment of the roller, this sleeve being held in adjusted positions by means of a set screw 214 threaded in the wall of said threaded bearing and bearing upon the sleeve for clamping the same in adjusted position.

The sleeve 201 is provided with a groove 215 (Figs. 15 and 20) in which the roller 203 is located. This groove has slanting side faces forming end thrust walls corresponding in form to the inverted frusto-conical form of the roller. The roller is endwise adjustable by means of the threaded connection 213, (Fig. 12) for endwise locating the sleeve 211 and taking up play and wear between the coacting faces of the cam and roller.

End thrust ball bearings 216, 217 are located in an inner annular rabbet 218 in the sleeve 201, being located between the bottom of said rabbet and a cap 219 for the end of said rabbet secured to said sleeve (Fig. 15). These ball bearings comprise an intermediate raceway 220, forming an inwardly extending annular flange located in an outer annular groove of the nut 140, formed by forming a rabbet in said nut to form one wall of the groove and a nut 221 threaded over the end of said nut 140. This construction exemplifies means for reducing the friction of the end thrust of the nut 140 during either direction of axial movement of the screw respectively for forward and reverse movements of the tool.

It is desired to impart a dwell at the end of the cutting movement, it being understood that the present invention is adapted for high speed operation employing tools of high speed steel, which are somewhat brittle. It is desired that the end of the feeding movement of the tool be at reduced speed for insuring accuracy and a clean runout at the end of the cut. For accomplishing this in the present exemplification longitudinal movement is imparted to the nut 140, opposite to the feeding movement of the tool so as to reduce the speed of this feed.

An intermediate sleeve 222 has spline connection 223 with the nut 140 and is interposed between the sleeves 79 and 201 about the nut (Fig. 15). The sleeve 222 and the sleeve 201 are provided with engaging clutch members to form a clutch 224, shown as internal teeth on the sleeve 222, and external teeth on the cap 219 which is part of the sleeve 201. These teeth are normally disengaged. Means are provided, acted on by one of the feeding parts, for engaging this clutch. When this clutch is engaged the sleeve 201 is connected with the nut 140 for rotating therewith.

The groove 215 is formed as a cam groove so that when such rotative motion is imparted to the sleeve 201 the cam will climb with relation to the roller 203 for moving the sleeve 201 axially oppositely to the direction of axial feeding movement of the screw, thereby qualifying the endwise feeding movement of the screw and reducing the speed of feeding movement of the tool, so that the movement of the tool is the differential between the opposite axial movements imparted by the nut 140 and the sleeve 201. The cam draws the nut endwise opposite to the direction of feeding travel of the screw with increasing speed, so that at the completion of the feeding movement, the nut is moved by the cam axially at substantially the axial feeding speed of the screw, to practically nullify said feeding movement, whereby the forward feed of the tool diminishes and ceases, enabling the tool to finish the cutting with reducing strains, enabling sharp corners and shoulders to be turned, avoiding the appearance of steps in the turned work, and providing a clean runout for the tool.

The means exemplified for axial movement of the intermediate sleeve 222, for engaging the clutch 224 (Figs. 11, 15 and 18) are a finger 227 in an annular groove 228 in said sleeve, the finger being fixed to a rock shaft 229 journaled in the control box 65, and having on it a pinion 230, which is meshed by a rack 231, on a collar 232. The collar is on a reduced end 233 of an axially movable bar 234. A collar 235 is fixed to this reduced extension, a spring 236 being located between the collars and moving the collar 232 for normally holding it against a shoulder 237 on said bar. The bar is slidable endwise in a bearing 238 in the casing of the control box.

The bar is provided with a rack 241 meshed by the teeth of a segment gear 242, (Figs. 15 and 18), fixed to a shaft 243, rockable in a bearing 244 protruding from the end wall of the control box. An arm 245 is also fixed to this shaft and has on it a pin 246. An engaging shoe 247 for the pin is secured to a lug 248 on the cup 142, by means of a screw 249 threaded into said shoe and extending through a slot 250 in said lug for permitting adjustment of the shoe lengthwise of the shaft or extension 51 to adjust the moment of actuation of the bar 234.

The cup 142 is provided with a cam face 251, arranged to engage the pin when the screw 80 moves in reverse direction, the pin being received in the slot between said cam face and the cam end of the shoe 247. The cup is provided with a further cam face 252, arranged to engage the pin in forward direction for lifting the pin into said slot if it should have descended below the apex between the cam faces 251, 252.

When the screw 80 moves forward or to the left in Fig. 15, the pin is engaged by the cam face on the shoe 247 for rocking the segment 242 and moving the endwise movable bar 234 endwise to the right, thereby rocking the pinion 230 and rocking the finger 227 for forward movement of the intermediate sleeve 222 and consequent engagement of the teeth of the clutch 224. If in such movement the clutch teeth should be in obstructing relation to each other, the spring 236 permits the reduced end 233 to move endwise in the rack collar 232, the spring moving the rack collar and the sleeve for engaged relation in the clutch, as soon as its clutch teeth on the sleeve 222 move opposite the tooth spaces on the sleeve 201.

A spring pressed ball 253 (Fig. 15) in a bore in the wall of the control box is arranged to be received in a groove 256 in the longitudinally movable bar for holding said bar in position of disengaged relation of the clutch.

The extent of rotative movement of the sleeve 201 for counteracting the feeding movement of the screw 80 depends on the amount of such retracting movement of the screw that it is desired shall take place. At the end of such retractive movement the sleeve 201 will have rotated throughout the desired angle and any portion of the cam groove, preferably a dwell creating portion thereof, may be coactive with the roller 203 (Figs. 12, 15 and 20).

Upon cessation of such feeding movement a reverse movement or traverse takes place for rotating the sleeve 201 in opposite direction and replacing the parts in normal position. This reversing movement is a quick traverse movement. In order to cushion the consequent quick reverse rotation of the sleeve 201, a cushion (Figs. 12, 13, 15 and 20) is provided comprising a plunger 258, having reversely inclined contact faces 259 coacting with the reversely inclined contact faces 260 of a shoe 261 secured in a slot 262 in a wall 263 between the proximate ends of the cam groove. The plunger reciprocates in a shell 264, threaded into a threaded bore 265, in the casing of the control box. A spring 266 has one end thereof located in a bore 267 of said cushion plunger, the other end of the spring being seated in a plug 268, threaded into the outer end of the shell 264. A locating screw 269 is threaded into a threaded hole in the casing, its inner end being received in a slot 270 in said shell and in a slot 271 in said plunger for locating the cam faces 259 in proper direction for coaction with the cam faces 260.

The retracting rotation of the cam sleeve 201 is a quick traverse movement and at the end thereof the shoe 261 strikes the plunger 258 for reducing its speed. The plunger acts as a cushion. The shoe passes under the plunger and becomes located between the plunger and the roller 203 for holding the cam sleeve 201 in normal position against any rotative urge which might be imparted thereto by the rotation of adjacent parts about the axis of the screw 80.

The shaft extension 52 (Figs. 2, 27, 32 and 33) is journaled in bearings 275 of the rear carriage 23 and has a worm 276 splined thereto by a spline connection 277. This worm meshes with a worm wheel 278 on a cam drum 279 fixed to a shaft 280 journaled in bearings 281, 282 in said carriage.

The rear carriage is moved into desired position lengthwise of the rear guideways 24, as by shifting the same manually thereon. It is clamped in desired adjusted position by clamps 283, for locating the path of the crosswise movement of the rear tool slide 21.

The cam drum 279 is provided with a cam slot 285, into which a roller 286 journaled about a stem 287, secured in a bearing 288 of an adjustable block 289, is received. This roller is held toward the adjustable block by the head 290 of said stem.

The adjustable block is adjustable in the tool slide by means of a threaded rod 291, (Figs. 2, 27 and 32), which has threaded connection in a threaded bore 292 of said adjusting block, and is rotatable and held endwise in a bearing 293 in the tool slide, and has thereon a knurled head 294 for rotating the same, there being a suitable index for the knurled head.

This adjustable block has a dovetail groove 295 extending lengthwise in its upper face in which the head 296 of a clamp bolt 297 is received. The clamp bolt extends through a hole 298 in the tool slide and has a clamp nut 299 threaded thereover for clamping the tool slide to the intermediate block after adjustment.

In the present exemplification feeding and quick traverse movements of the rear tool toward and from the axis of the work only are indicated for performing such operations as facing, grooving, cutting off and the like, either complemental to or independent of the movements of the tool or tools on the front tool support, although it is obvious that movements lengthwise of the bed may also be imparted to the rear tool either in conjunction with or independent of the cross-movements thereof, and that the mechanism for feeding and quick traverse of the front tool support and of the rear tool support may be selectively duplicated at the front and at the rear of the machine within the scope of my invention set forth in the accompanying claims.

In the present exemplification the lead of the cam drum 279 is such as to cause performance of the cutting operations of the rear tool or tools during performance of the cutting operation of the front tool or tools. Quick traverse movements may be imparted to the rear tool or tools either in forward direction or reverse direction, with intermediate feeding movements, as by imparting rapid rotations to the rear lengthwise shaft and its extension in forward or reverse directions by means of the rear quick traverse electric motor 102, or feeding rotations may be imparted to said lengthwise shaft and extension by means of the speed change train of gearing 59, which have rotations imparted thereto in consonance with the rotations of the head spindle or driving shaft for the work.

A dwell is provided for the end of extreme inward movement and extreme outward movement of the tool slide, as by reducing the lead of the cam in the cam drum at each end thereof, (Fig. 34), as by the dwell portions 301, 302 thereof, which terminate substantially perpendicular to the axis of the drum. This provides for clean runout of the tool and the cutting of accurate corners and shoulders and prevents steps from being perceptible in turning operations at the end of the feeding movement of the tool, and for smooth and easy transitions from one direction of movement or control to another in the operation of the rear tool support.

Braking means are also provided for the rear tool support to avoid overrunning of the tool, effective at the end of tool movement in any selective direction.

In the present exemplification this braking means is exemplified as comprising a fluid pump 305, (Figs. 22, 23, 25 and 26) for fluid, such as oil, embracing meshing gears 306, 307 fixed to shafts 308, 309, journaled in bearings in the rear control box. The shaft 308 is rotated by the shaft 110 and coupled thereto by a coupling 310. The meshing portions of the gears rotate in a passage 311, the respective ends of which have fluid conduits 312, 313 connected therewith, the other of the ends of these fluid conduits having connections with passages 314, 315 in the body of the control box. There is a check valve 316 between said passages, shown as a ball, spring-pressed by a spring 317 to normally seat on its seat between said passages. A threaded plug 318 closes the end of the bore in which said spring is located. A cross-passage 319 communicates with the passage 315, the outer end of this passage being closed by a threaded plug 320.

A sleeve 321 (Fig. 26) has a bore 322 provided with an enlargement 323, forming a shoulder 324. The sleeve is secured in a bore 325 in the body of the control box. Said bore has an annular shoulder 326 at one end of said sleeve. The enlarged bore of said sleeve is provided with a threaded outer end in which a headed plug 327 is threaded for clamping the sleeve in longitudinal direction in its bore so as to prevent leakage of fluid past said sleeve.

The outer periphery of said sleeve is provided with annular grooves 331, 332, from which holes 333, 334 radiate into the inner bore 322 of said sleeve.

A piston 335 is reciprocable in the bore in the sleeve and is provided with a head 336 at one of its ends, arranged to contact the shoulder 324 toward which such piston is resiliently pressed by a spring 337 between said piston and the plug 327. This piston is provided with an annular groove 338 with which the radiating holes 333, 334 normally communicate when the piston is in normal position.

The piston is arranged to be moved lengthwise for closing the radiating holes 333 and stopping flow from the fluid conduit 313 into the valve by reason of the stoppage of said holes and the presence of the check valve 316. This occurs at the end of reverse quick traverse rotation of the quick traverse motor 102, to determine the correct positions of the mechanisms and of the rear tool or tools at the end of their cycles of movements, whereby to position the parts ready for actuations at the beginning of the next cycle, for instance, after cessation of cutting movements of the rear tool or tools, for removal of the work and the placing of a new piece of work in the machine.

The actuation of the piston 335 is obtained by means of an actuating arm 341 (Figs. 21, 22, 24 and 26) fixed to a shaft 342, journaled in a bearing 343, 344 of the control box. This arm carries an adjusting bolt 345 arranged to be adjusted in the arm for adjusting the moment of actuation of the piston. The shaft has an operated arm 346 thereon.

The shaft 92 (Figs. 21, 22, 23 and 24) has a worm 347 thereon, which meshes with a worm wheel 348 fixed to a shaft 349, journaled in bearings 350, 351 in the control box 66. This shaft has fixed thereto a tappet wheel 352, which has thereon a tappet 353, shown as a block adjustable along a peripheral rib 354 on said wheel and fixed to said wheel in adjusted position by means of a set bolt 355. This tappet is arranged to strike the arm 346 at the appropriate moment for actuation of the arm 341, in order to move the piston 335 into obstructing position, for braking the actuated parts of the rear mechanism at the end of reverse traverse movement thereof. The arm 346 is arranged to ride on the outer periphery of this tappet until completion of the braking movement.

The weight and friction of the carriage on the bed is greater than the weight and friction of the tool slide on the carriage, so that cross movement of the tool slide on the carriage is more ready than sliding movement of the carriage lengthwise of the bed during lengthwise movemen of the cam plate 155 in the carriage. This difference may be increased by drawing up on the clamp bolts 356 acting on the guideway plate 357 of the carriage for insuring preponderance of cross slide movement. If desired, means may be provided for latching the cam plate 155 selectively to the carriage and latching the carriage selectively to the bed.

These means are exemplified as an upright rock shaft 358 (Figs. 1, 3, 4, 27, and 31) journaled in a bearing 359 in the carriage. This rock shaft at its upper end has a latch 360 at one side of its axis and a clearance space 361 at the other side of its axis. At its lower end the rock shaft has a clearance space 362 at said one side of its axis and a latch 363 and a cam contact face 364 one above the other, at said other side of its axis. The upper end of the rock shaft is also provided with an arm 365 rigid therewith, which has a toe 366 at said one side of its axis and a heel 367 at said other side of its axis, at the side of which latter there is a contact face 368.

A contact plate 369 and a keeper plate 370 are secured in desired relation to each other on the lower face of the cam plate 155, respectively by bolts 371, 372, the heads of which are countersunk in said respective plates 369, 370, the bolts being respectively threaded in threaded holes 373, 374 in the cam-plate in desired relation to the cam slot in said cam plate 155 and for desired coaction respectively with said toe 366 and the latch 360. The contact plate 369 is thicker than the keeper plate 370 so as to reach the arm 365; the keeper plate 370, the clearance space 361 and latch 360 being above the level of said arm.

A plunger 375 reciprocates in a bore 376 of the carriage and engages the heel 367. It is spring pressed towards the heel by a spring 377 in a bore in the outer end of the plunger, resisted by a plug 378 threaded in the outer end of the bore 376. The spring and plunger normally urge the rock shaft 358 in clockwise direction looking at the top of the rock shaft, the contact face 368 limiting rotation of the rock shaft.

A cam slide 381 has a cam plate 382 releasably secured thereto by screws 383. (Figs. 1, 4, and 27). This cam plate has a cam face 384 thereon. This slide is adjustable lengthwise of the bed along a guideway 385, along which an undercut slot 386 is formed in the bed. The heads of bolts 387 are located in this slot, the bolts extending through the cam slide, nuts 388 clamping the slide in adjusted position to the bed.

A keeper plate 389 has a keeper face 390 thereon. This keeper plate is adjustable lengthwise on the cam slide and is secured in adjusted positions thereon by clamp bolts 391 passing through slots 392 in the keeper plate and threaded into the cam slide. The cam slide and keeper plate are adjustable lengthwise of the bed and are arranged to be clamped in adjusted positions related to the desired coaction with the latch and cam contacting face on the lower end of the rock shaft according to desired coactions between the parts at the upper end of the rock shaft and the parts on the cam plate 155.

The latch 360 coacts with a keeper face 393 on the keeper plate 370 for latching the cam plate 155 with its nut 153 engaging the stop 165 for obtaining combined movements of the carriage and tool slide lengthwise of the bed in certain operations. (Figs. 1, 3, 4, 27, and 31). This latch is disengaged by coaction between the cam contacting face 364 and the cam 384.

The latch 363 is released by contact of the nose 394 on the contact plate 369 with the toe 366 on the arm 365, in order to permit lengthwise movement of the carriage in feeding direction.

If the slide 381 and the plate thereon should be in obstructing relation with the faces at the lower end of the rock shaft during movement of the carriage toward the tail stock with the slide 381 between said upright shaft and the tail stock, said faces on the lower end of the upright rock shaft will ride upon the obstructing faces on the cam slide 381 and the keeper plate thereon, resiliently rocking said upright shaft against the resistance of the spring-pressed plunger 375, which immediately returns the rock to normal rocked position as soon as it has passed the obstructing faces on said cam slide.

The cam slide 381 and the keeper plate 389 may be adjusted lengthwise of the bed for desired coactions with the latch and cam contacting face at the lower end of the rock shaft, or lack of such coactions, as may be respectively desired for various operations upon the work, in some of which the keeper plate 370 on the cam slide 155 is inactive.

When forward traverse movement of the tool slide toward the work is to take place, the roller 166 is initially in the outer end of the cam slot 161 in the cam plate 155. (See Figs. 3, 31, and 36 to 39 inclusive.) This cam slot slants from the inner edge of said cam plate toward the outer edge and head end thereof across the longitudinal median line of said cam plate. The nut 153, the contact plate 369, and the keeper plate 370 are on the under face of said cam plate 155 forward of said median line.

In certain classes of work it is desired that there be a feeding movement of the tool slide in a direction away from the axis of the centers of the lathe. In such cases the cam plate 155 is reversed on its longitudinal axis so that its cam slot 161 slants from its outer edge inwardly toward the head end of the lathe, as exemplified in Figs. 40 to 43 inclusive.

When such relation of the cam plate is desired, the bolts 154 which pass through holes 395 in the cam plate 155 and hold it to the nut 153 (Fig. 28) are unscrewed, and the bolts 371, 372 (Figs. 3 and 31) respectively threaded in the holes 373, 374 in the cam plate 155 for clamping the contact plate 369 and the keeper plate 370 to the under face of the cam plate 155, are unscrewed, and such nut and plates are fastened to the opposite face of said cam plate and at the opposite side of the longitudinal median line thereof, the bolts 154 passing through holes 395', the bolts 371 being screwed into threaded holes 373', and the bolts 372 being screwed into threaded holes 374'.

Such various contacts and changes in relation of the latches, keepers and cams take place substantially at the initiations of changes in speeds and directions of tool movement, such changes in speeds and directions of movement lengthwise of the bed and selectively toward or from the work being determined by the electric control means to be now described.

Electrical control is provided for controlling the feeding movements and the quick traversing movements in forward and reverse directions of the operating shafts extending lengthwise of the bed and connecting with the tool supports, and the moments of initiations of said movements.

Referring now to the front shaft, there is a double pole switch 401 (Figs. 15, 16, 17 and 35), comprising a control switch 402 in the reversing circuit of the front quick traverse motor 101 and a control switch 403 in the main motor control circuit. These switches are reversely actuated for closing the reversing control switch for the quick traverse motor 101 and opening the control switch in the main motor circuit at the end of the feeding movement of the cutting tool and actuated by an element concerned in such feeding movement, which is exemplified as the cam sleeve 201.

A shoe 404 is located in an annular groove 405 in said cam sleeve and moves the shoe with the axial movement of the cam sleeve. This shoe is on an arm 406, fixed to a rock shaft 407, journaled in a bearing 408, stationary on the control box, and having an arm 409 fixed thereto. This arm is provided with a fork 410, arranged to coact with pins 411 on a plunger 412 provided with a head 413, arranged to contact the button 414 for operating the double pole switch 401 (Fig. 17) comprising the control switches 402, 403 (Fig. 35) just mentioned.

Before such actuation and while the operating arm is in position shown in Fig. 17, the switch 403 for the main motor circuit is closed and the switch 402 for the reversing circuit of the front traversing motor is open, the plunger being held in this relation by means of a latch 415, shown in the form of a bell-crank lever, and arranged to engage the head 413 of the plunger for holding said control switches in the relations last stated until actuation of the cam sleeve 201 for moving said sleeve endwise at the final portion of the feeding movement of the tool.

When this endwise movement takes place the arm 409 is moved for releasing the latch 415, this operating arm being provided with a contact rod 416 shown in the form of a threaded rod adjusted lengthwise in a threaded bearing 417 of said arm and held in adjusted position by a jam nut 418. This contact rod is arranged to engage the lever latch 415, which is normally spring-pressed into engaging relation with the head 413 by a spring 419.

The tripping of this lever releases the plunger 412, which releases the button 414, normally spring-pressed outwardly by a spring 420 for opening the control switch 403 in the main motor circuit and closing the switch 402 in the reversing circuit of the quick traverse motor 101 and placing the screw 80 under the operative influence of the quick traverse motor 101 operating in reverse direction for reversely quick traversing the tool.

Return of the cam sleeve 201 to normal position, which takes place immediately after its actuation at the end of feeding movement of the tool, returns the arm 409 to normal position for moving the plunger 412 in reverse direction and again engaging the latch 415, it being understood that these control switches control relay switches, to be hereinafter described.

A switch operating arm 421 (Figs. 14, 15 and 35) is fixed to a rock shaft 422, journaled in a bearing 423, extending from the supporting frame of the front quick traverse motor, and having thereon a cam head 424 for engaging rollers 425, 426 respectively on an operating arm 427 of a double acting single pole snap control switch 428 arranged, when open, to open the forward circuit of the front quick traverse motor 101.

It is assumed that all control and relay circuits are normally open circuits, and this description refers to the switches being open or closed accordingly, although it is obvious that the circuits may be normally closed circuits, in which the open and closed conditions of the control and relay switches would be reversed, and that other changes in electric devices and circuits may be made, without departing from the spirit of my invention set forth in the accompanying claims.

The arm 421 is received in the longitudinal slot 197 extending lengthwise of the screw 80. There is a bore 431 in the end of this screw rod with which the slot 197 communicates. A tappet 432 is adjustable lengthwise in this bore and coacts with the arm 421 to operate the control switch 428. A screw rod 433 has threaded connection with this tappet for adjusting the tappet lengthwise of the bore and slot for adjustable coaction with the tappet arm 421.

The screw rod 433 has bearing in a plug 434 threaded into the outer end of this bore. The screw rod further has a collar 435 fixed to it at one side of said plug and an operating head 436 fixed to it at the other side of this plug for holding the rod to prevent its axial movement. A protecting hood 437 having an extension 438, is received over the switches and the outer end of the screw, and is suitably secured to the supporting plate 103 and has a closing cap 439 at its outer end. The extension is removable from the hood proper by having releasable connection shown as a bayonet connection 440 with the hood.

When the screw 80 is moved outwardly the tappet 432 engages the tappet arm 421 and operates the control switch 428 in one direction at the end of the forward transverse movement at a moment determined by the adjustment of the tappet 432, and thereby places said feed shaft under rotative influence of the feed mechanism in consonance with the rotative movement of the spindle. Upon retractive movement of the screw 80, to the right as shown in Fig. 15, the tappet 432 engages the tappet arm 421 in opposite direction for resetting the control switch 428.

The screw 80 is provided with a collar 441 (Figs. 14 and 15) threaded to the screw and arranged to be positioned lengthwise of the screw and to be clamped in adjusted position by a clamping screw 442, drawing together a split portion of said collar for clamping the screw threads.

This collar is arranged to engage a buffer sleeve 443 movable endwise in a bearing 444 about the screw and backed by a buffer spring 445 between said buffer sleeve and an annular shoulder 446 at the end of said bearing, outward movement of the buffer sleeve being limited by shoulders 447 between it and said bearing. This buffer cushions the inward quick reverse traversing movement of the screw at the end of said movement.

The collar 441 is also arranged to contact the tappet arm 421 if this tappet arm should not have been moved sufficiently by the tappet 432 upon the retraction of the latter for insuring resetting of the switch 428.

The collar 441 is further arranged to contact the button 448 of a single pole control switch 449 for controlling the stopping of the reverse traverse of the tool. This switch is physically mounted on the bearing 444.

In the present exemplification the rear tool slide 21 is moved toward the center of the work, first with a quick forward traverse by the forward rotation of the quick traverse motor 102, initiated by the push button 451, (Fig. 35), which closes the switch 452 in the forward circuit of the main motor and a switch 453 in the forward traverse circuits of the front quick traverse motor 101 and of the rear quick traverse motor 102.

This quick forward traverse of the slide 21 continues until the tool is nearly in actuating relation with the work, whereupon the forward quick traverse circuit of the quick traverse motor 102 is opened by opening a switch 454 in said circuit, (Figs. 21, 22, 23, 24 and 35), which is exemplified as a single pole snap switch and having an operating shaft 455 journaled in a bearing 456 and provided with an operating arm 457 arranged to be engaged by a tappet 458 adjustably secured to the tappet wheel 352 for opening this switch and maintaining it open until again actuated by said tappet moving in reverse direction for moving said arm and again resetting said switch 454 after reverse actuation of said traverse motor.

Figure 34:
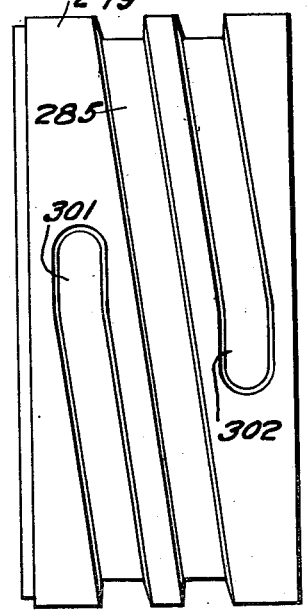
Fig. 34 is a developed plan view of the rear tool slide actuating cam.
Figure 33:
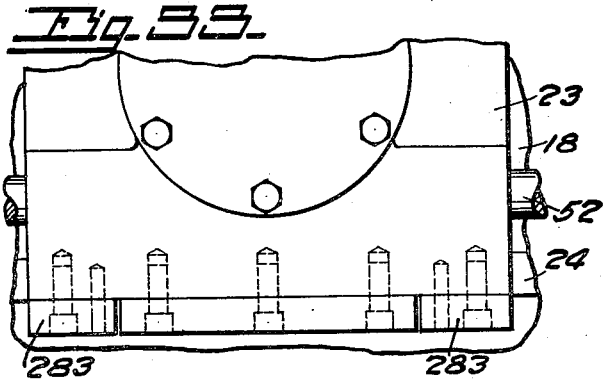
Fig. 33 is a rear view of the rear carriage, partly broken away.

After cessation of forward traverse movement of the tool, the tool is fed into the work by the feed gearing including the train of change gearing 59 and by coaction of the roller 286 with the cam slot 285 in the cam drum 279 (Figs. 27 and 34). The final portion of this feeding movement is during coaction of said roller with the end portion 301 having reducing lead in said slot, for proper finish of the cut and proper runout of the tool, forming sharp corners and shoulders and preventing ridges in the work.

At the end of the feeding movement, a quick reverse movement of the tool takes place controlled by the actuation of a double pole reverse traverse switch, including a switch 461 for momentarily closing the reverse circuit of the quick traverse motor 102, and a switch 462 in the main motor control circuit, which is opened (Figs. 21, 22, 23 and 35).

These switches are operated by a shaft 463, journaled in a bearing 464, and having thereon an arm 465, engaged by a tappet 466, which is adjustable about the tappet wheel 352. This tappet is received in a recess 467 of said arm during the end of the feeding movement of the tool toward the work, and actuates said arm at the end of said feeding movement for actuating the switches 461, 462. The momentary closing of the switch 461 energizes the reverse circuit of the quick traverse motor 102, whereupon the tappet wheel reverses and the tappet 466 moves in opposite direction for actuating the arm 465 in reverse direction, and thereby resets the switch 461, it being understood that the momentary closing of this switch has energized a relay switch for maintaining the reverse circuit of the quick traverse motor 102 closed.

This reverse rotation of the tappet wheel continues until the tappet 353 moves the arm 346 for rocking the shaft 342 (Figs. 21, 22, 23 and 24). This rock shaft has on it an arm 471, which contacts a push button 472 of a normally closed single pole switch 473 for opening this switch at the end of the reverse quick traverse of the tool. This switch is in the reversing circuit of the quick traverse motor 102. This positions the tool at the end of its cycle of movements, ready to begin another cycle of its movements after the work just cut has been removed and a new piece of work inserted in the machine.

In explaining the operation of the machine it will be assumed that the front tools have movements imparted thereto to complete a cycle of operation such, for instance, as depicted in Figs. 36 to 39 inclusive, and reference is also had to the electrical diagram shown in Fig. 35. The various mechanisms of the machine are at rest, the main motor and the quick traverse motors being deenergized.

In starting the operation, the starting button 451 is depressed. This closes the switch 452 in the control circuit for the relay coil 475 of normally open relay switches 476, 477, 478, 479 and 480, and opens closed relay switch 481. The switches 477, 478, 479 are in the respective lines of the three-phase circuit exemplified, the outside lines 482 of which are connected with the binding posts 483 of the relay panel 484. This panel is secured by bolts 485 to flanges 486 of the base under the head stock and is located in a compartment 487 in said base, (Fig. 1).

The switch 480 closes the maintaining circuit of the relay coil for maintaining the switches 476, 477, 478, 479 closed and the switch 481 open during closed relation of this maintaining circuit. The switch 481 is in the circuit of the coil 488 of the reversing relay for the main motor.

The closing of the switches 477, 478, 479 rotates the main motor in forward direction.

The depressing of the starting button 451 also closes the switch 453, which closes the circuit for the coil 489 of switches 490, 491.

The switch 491 closes the circuit through the switch 428, the coil 492, and the selector switch 493 operated by a knob 494. Energizing of the coil 492 closes the motor switches 495, 496, 497 for forward traverse of the front quick traverse motor 101, and the maintaining switch 498 for said coil 492, to form a relay switch.

The switch 490 closes the circuit through the switch 454, the coil 499, and the selector switch 500 operated by a knob 501. Energizing of the coil 499 closes the motor switches 502, 503, 504 for forward traverse of the rear quick traverse motor 102, and the maintaining switch 505 for said coil 499, to form a relay switch.

The three motors are thus started, the main motor rotating the work and being in interrupted feed connection with the lengthwise shafts 51, 52, for actuations of said lengthwise shafts in consonance with the work rotation through the speed change gearings 58, 59, when the interruptions are discontinued. The quick traverse motors 101, 102 rotate in forward directions for rapid forward rotations of the gears 108, 113 for moving the sleeves 76, 89 lengthwise and disengaging the clutches 116, 116', and thereby placing said lengthwise feed shafts 51, 52 under influence of the forward rotations for the quick traverse motors, resulting in forward quick traverse movements of the tool slides for moving the tool slides rapidly toward the work. The path of the front tool during such rapid forward traverse is exemplified by the dotted line 506 in Fig. 36, and is caused by a quick traverse movement of the cam plate 155, the carriage 17 remaining at rest.

When the forward traverse of the tools has been completed for placing the tools in proper feeding relation with the work, the quick traverse motors are deenergized for placing the tools under the influence of the feeding trains in consonance with tool rotation.

The circuit for the forward traverse motor is opened by coaction between the tappet 432 (Fig. 15) and the tappet arm 421 for opening the control switch 428 (Fig. 14) which is in the maintaining circuit for the coil 492 (Fig. 35) for opening the maintaining switch 498 therein, and releasing the motor switches 495, 496, 497 of the front quick traverse motor.

The rear quick traverse motor 102 is also deenergized by having the tappet 458 (Fig. 24) move the arm 457 for opening the switch 454 (Figs. 21 and 35) in the maintaining circuit of the coil 499 for opening the maintaining switch 505 and releasing the three forward motor switches 502, 503 and 504 in the motor circuit of the rear quick traverse motor 102.

The feeding path of the front tool is exemplified by the full line 507 in Fig. 37.

Upon completion of the feeding movements of the front and rear tool supports, the reversing circuits of the two quick traverse motors are closed for quick traverse rotations of these motors and return of the tool supports to initial positions, and the main motor is deenergized. The reverse circuit of the front quick traverse motor is closed by axial movement of the cam sleeve 201 (Figs. 15, 17 and 35), which actuates arm 409 and trips latch 415, thereby closing switch 402 and closing a circuit through switch 449, the coil 508 and selector switch 493.

Energizing coil 508 closes reverse motor switches 509, 510, 511 of the reversing circuit of the front quick traverse motor 101 and maintaining switch 512 in the circuit of said relay coil 508. This tripping of the latch 415 also opens switch 403 in the maintaining circuit for the coil 475 of the main motor forward switches 477, 478, 479 for deenergizing the main motor.

The reversing circuit for the rear quick traverse motor is closed by actuation of the arm 465 by tappet 466 for closing switch 461 (Figs. 21, 24 and 35), which closes a circuit through switch 473, coil 513, and selector switch 500. Energizing coil 513 closes the reverse rear quick traverse motor switches 514, 515, 516, and maintaining switch 517 for said coil 513.

The reversing movement of the front tool is caused by reversing movement of the tool slide, causing the tool path represented by the dotted line 518 in Fig. 38, and by reversing movement of the carriage, causing the tool path represented by the dotted line 519 in Fig. 39.

These reverse quick traverse movements continue until the tools arrive at their initial positions in their cycles of movements, in which positions they are arrested by deenergizing of the reverse traverse motors accomplished in the case of the front tool by the opening of switch 449 by actuation of its movable member by the collar 441 (Fig. 15), thereby deenergizing the coil 508 of the reverse front quick traverse motor relay switches 509, 510, 511, and the maintaining switch 512.

In case of the rear quick traverse motor, at the end of the reverse movement of the rear tool, the switch 473 is opened by the tappet 353 actuating the arm 346, thereby opening the maintaining circuit in which the coil 513 is contained, opening the reverse rear quick traverse motor relay switches 514, 515, 516, and the maintaining switch 517.

Referring to the deenergizing of the forward circuit of the main motor which takes place at the end of the feeding movements of the tools, it is desired to brake the forward coasting rotation of the main motor upon such deenergizing thereof, which is accomplished as follows: The actuation of the starting button 451 and closing of the switch 452 had closed the circuit in the coil 475 for opening the switch 481. The switch 481 is in the circuit of the coil 488 of the reversing relay of the main motor. At the same time the switch 476 had been closed for closing the circuit of coil 521, and thereby closing switches 522, 523. The switch 522 is in the maintaining circuit of this coil. The switch 523 is in the circuit of the coil 488, which circuit is however interrupted by open condition of the switch 481. Immediately upon beginning of rotation of main motor in forward direction, the main motor rotary switch 524 had been automatically actuated by the main motor to close, thereby completing the maintaining circuit of coil 521, and this switch is automatically maintained by forward rotation of the main motor, until it is automatically opened by reversal of rotation in the main motor.

At the end of the feeding movement of the tools the coil 475 is deenergized by opening of the switch 403 in the front control box 65 or the opening of the switch 462 in the rear control box 66, depending on the setting of the selector switches 525, 526, by the manual setting of the selector knob 527, dependent on whether the front tool or the rear tool functions last in the cutting operations in the setting of the tools. If the selector switch 526 is closed the maintaining circuit for the coil 475 is through switch 403. If the selector switch 525 is closed this maintaining circuit is through switch 462.

This maintaining circuit is opened by either switch 403 or switch 462 at the end of the feeding movement for deenergizing coil 475 and thereby closing switch 481 in the circuit of coil 488 for energizing this coil and closing switches 528, 529, 530 in the reversing circuit of the main motor, and serving as a brake upon the forward coasting movement therein.

Upon initiation of reversal in the main motor the switch 524 is automatically opened for interrupting the circuit in the coil 488 and opening the main motor reverse switches 528, 529, 530. Opening of the switch 524 also interrupts the circuit in coil 521 for opening switches 522, 523. These switch movements take place in almost instantaneous sequence for braking the main motor upon interruption of its forward energizing circuit.

Selector switches are provided for selective operation of the front traverse motor, including the switch 493, and the rear traverse motor, including the switch 500, so as to place either or both of these traverse motors in the automatically actuating circuits of the machine. A companion switch to 493 is the switch 531, and a companion switch to the switch 500 is the switch 532. The manually operated selector knob 494 selectively closes either of the switches 493, 531, and opens the other thereof. The manually operated selector knob 501 selectively closes either of the switches 500, 532, and opens the other thereof.

The opening of switch 493 opens the circuits for the coils 492, 508 of the relay switches for the front traverse motor, the closing of switch 531 however maintaining all other circuits which would otherwise be interrupted by the opening of switch 493.

The opening of switch 500 opens the circuits for the coils 499, 513 of the relay switches for the rear traverse motor, the closing of switch 532 however maintaining all other circuits which would otherwise be interrupted by the opening of switch 500.

Pressing the starting button 451 opens the switch 535 prior to closing the switch 453. The opening of the switch 535 places a gap in the maintaining circuit in which the coils 508, 513 are located, for preventing energizing of the circuits for reverse traverse of the front and rear quick traverse motors, when the switch 453 is closed for forward traverse of said motors. This is a safety feature.

A reversing button 536 is arranged for reversing the direction of actuation of the front quick traverse motor and the rear quick traverse motor at any point in the paths of the tool for withdrawing the tools and return thereof to initial positions. When this button is depressed it opens a switch 537 and closes switches 538, 539. The opening of the switch 537 forms a gap in the maintaining circuits in which the coils 492, 499 are located, for deenergizing the forward circuits of the front and rear quick traverse motors. The closing of the switches 538, 539 closes the circuits in which the coils 508, 513 are located for closing the switches for reverse traverse of the front and rear quick traverse motors.

A stop button 541 is provided for a switch 542, which is in the line coming from one of the main power lines 482, and is at one side of all of the circuits for all of the coils of the relay switches, and at one side of the reversing switches 537, 538, 539, and of the starting switches 452, 453, 535, so that upon opening of the stop switch 542 all electric functions of the mechanism cease.

In explaining this electrical diagram no attempt has been made to follow the conductors between the instruments mentioned, in order to avoid unnecessary and confusing description, as these conductors between the instruments can be readily traced from the diagram in Fig. 35.

The devices and electric connections on a supplemental panel 543 mounted on the main panel 484 are automatic temperature controlled overload devices and manual resetting devices for the same, these being usual devices of this character in the main motor circuit.

The control switches automatically actuated by the machine which are shown at the right of the panel 484 in Fig. 35 are located in the front control box and their wiring is connected with the wiring for the instruments on the panel including the relay control switches thereon, through binding posts, shown as a row of binding posts 544 at the right edge of the panel.

The control switches automatically actuated by the machine which are shown at the left of said panel in Fig. 35 are located in the rear control box, and their wiring is connected with the wiring for the instruments on the panel, including the relay control switches thereon, through binding posts, shown as a row of binding posts 545 at the left edge of the panel.

The head end of the compartment 487 in which the panel 484 is located, is provided with an opening 546, through which the instruments on the compartment may be manipulated or handled. This opening is closed by a releasable louvre hood 547, releasably secured to the wall of said opening. The hood has an end opening closed by a louvre plate 548 releasably held in place by suitable spring latches.

The cycle of movements shown in Figs. 36 to 39 inclusive is a turning cycle, in which the outer periphery of the piece of work is turned. The beginning of this cycle is at 549. A facing cycle in which the face 1ᵃ of a piece of work 1ᵇ is cut is shown in Figs. 40 to 43 inclusive. In performing this facing cycle the cam plate 155 is reversed. The beginning of this cycle is at 550.

In a facing cycle, there is first a quick traverse combined movement of the tool slide and carriage lengthwise of the bed toward the head stock, in a path represented by the dotted line 551 in Fig. 40. This is performed by the forward actuation of the front quick traverse motor.

Outward feeding movement of the tool in a path at right angles to the center of the work next takes place for cutting the face 1ᵃ, represented by the full line 552 in Fig. 41. This is performed by the forward feeding action of the speed change gearing operated in consonance with the speed of rotation of the work.

Reversal next takes place by energizing the reverse circuit of the front quick traverse motor, which results first in a reverse traverse movement of the tool slide, for reverse path of the tool represented by the dotted line 553 in Fig. 42, and continued as a reverse traverse movement of the carriage in which the path of the tool is represented by the dotted line 554 in Fig. 43, to return the tool to initial position.

Other cycles of tool movements may be obtained, depending on the moments of transition from forward traverse to feeding movement and from feeding movement to reverse traverse with relation to the directions of movements of the tool slide and the carriage.

It is not thought necessary to further explain these various cycles or the adjustments of the tappets and control switch operating means, or selections of cam plates having cam slots of various contours in the front carriage or cam drums in the rear carriage, or manipulations of others of the parts hereinbefore described, for other cycles performing various cuts or kinds of work or paths of cutting tools, as these will be readily observed from the teachings of the foregoing description by those skilled in the art to which this invention relates.

If it is desired to employ tool slide and carriage latches, the various relations of these latches in performing a turning cycle are exemplified in Figs. 36 to 39 inclusive, and in performing a facing cycle in Figs. 40 to 43 inclusive.

Referring again to the means for creating pause in the feeding movement, the cam 215 preferably has a plurality of leads, the beginning portion 557 of the cam having a less lead, and the balance portion 558 of the cam having a greater lead, these leads being counter to the lead of the screw 80 and the coacting thread in the nut 140 (Figs. 11, 15 and 20). The beginning portion reduces the feed of the screw 80 and the balance portion preferably has a lead the same as but in opposite direction to the lead of the screw and nut, so that, during coaction of the anchor or roller 203 therewith, there is substantially no feeding movement, for creating a dwell or pause in the feed while the work continues to rotate at least one and in practice a number of revolutions at the end of the feeding movement, to provide a clean cut at the end of the finished portion of the work.

The angular relation of this counter cam or thread 215 and the nut is also controlled by providing the clutch 224 (Figs. 15 and 17a) with a small number of teeth having wide tooth spaces therebetween. Thus the clutch member on the sleeve 222 is provided with a pair of opposite clutch teeth 559 having wide tooth spaces 560 therebetween, and the cam sleeve 201 is provided with opposite clutch teeth 561 having wide tooth spaces therebetween.

The parts are so assembled that the same coating sides of the teeth coact throughout, as by locating each of the clutch teeth in line with a given tooth space, in order that the radial position of the beginning of the cam 215 registers with a corresponding radial plane of the nut 140 when the clutch connects the nut and cam sleeve, whereby initiation of counter movement of the cam sleeve uniformly begins when the same point in the circumference of the nut reaches the radial plane in which the anchor 203 is located. The angular positioning of the driving member of the clutch is aided by the castellated form of the spline connection 223 (Fig. 15), which is similar to the castellated spline connection 139 (Fig. 11) between the sleeve 79 and the nut 140.

The construction and arrangement of the parts and the relation of the tripping device for the control switches of the electric motors is preferably such that stoppage of the main motor is assured, for stoppage of rotation of the work, and withdrawal of the tool upon reverse quick traverse movement thereof takes place during such stoppage, so that the tool will not spirally score the work, and unobjectionable withdrawal of the tool is insured.

The moments of cessation of the forward quick traverse, the beginning of the feeding including the reducing of the speed of feed and the pause of feed, the beginning of the reverse quick traverse and the cessation of reverse quick traverse movements between the tool support and the work support, all with relation to the cutting to be done on the work, in the performance of the given cycle of movements, can be accurately determined by the adjustments of the tappets and contacts hereinbefore described for automatic beginnings and endings of the respective operations required by the particular work being done.

I have explained the relations between the various elements and their functions in the present exemplification. It is obvious that changes may be made in these; that elaborations may be made upon the same; and that rearrangements of parts may be devised, without departing from the spirit of my invention set forth in the appended claims.

I do not herein broadly claim the relatively preponderant power trains, instanced as low speed and high speed trains, and the power transmitting member in association therewith, and reacting one on the other for interruption in one of said power trains by preponderant drive in the other of said power trains, nor broadly the maintainance of such interruption upon cessation of such preponderant drive, nor broadly such maintainance until reversal of said preponderant power drive, nor broadly the manual manipulation in said preponderant drive, herein shown and described, having shown, described and broadly claimed the same in my copending divisional application for Letters Patent of the United States on improvement in Power transmitting mechanism, Serial No. 78,438 filed May 7, 1936, which is a division hereof.

I claim:

1. The combination of a work support, a tool support, actuating means for cutting movement between said supports, a train of feeding means for feeding movements of said actuating means, forward and reverse quick traverse means for said actuating means, part of said train of feeding means and of said quick traverse means being common to each other and including automatic transmission relieving means in said train of feeding means operated by preponderance of speed in said quick traverse means, and cushioning means active at the end of reverse movement of said quick traverse means for positioning said actuating means at the end of its cycle of movements.

2. The combination of a work support, a tool support, an axially movable shaft having operative connection with one of said supports for movement between said supports, an interthreaded screw and nut for feeding movement of said shaft, said screw and nut constituting a pair of members one of which is rotatable and the other of which is endwise movable by such interthreading, one of said members having operative connection with said shaft for operating said shaft, and a normally inactive endwise moving means about said endwise movable member for said rotatable member to move said rotatable member endwise opposite to the direction of endwise movement of said endwise movable member to react on the feeding movement between said supports.

3. The combination of a work support, a tool support, an axially movable shaft having operative connection with one of said supports for movement between said supports, an interthreaded screw and nut for feeding movement of said shaft, said screw and nut constituting a pair of members one of which is rotatable and the other of which is endwise movable by such interthreading, one of said members having operative connection with said shaft for operating said shaft, a normally inactive endwise moving means about said endwise movable member for said rotatable member to move said rotatable member endwise opposite to the direction of endwise movement of said endwise movable member to react on the feeding movement between said supports, said normally inactive endwise moving means being reversible for return to normal inactive position, and a cushion stop for cushioning such reversal.

4. The combination of a work support, a tool support, an axially movable shaft having operative connection with one of said supports for movement between said supports, an interthreaded screw and nut for feeding movement of said shaft, said screw and nut constituting a pair of members one of which is rotatable and the other of which is endwise movable by such interthreading, one of said members having operative connection with said shaft for operating said shaft, a normally inactive endwise moving means about said endwise movable member for said rotatable member to move said rotatable member endwise opposite to the direction of endwise movement of said endwise movable member to react on the feeding movement between said supports, and actuating means for said normally inactive endwise moving means having operative connection with said endwise movable member.

5. The combination of a work support, a tool support, an axially movable shaft having operative connection with one of said supports for movement between said supports, an interthreaded screw and nut, said screw and nut constituting a pair of members one of which is rotatable and the other of which is endwise movable by such interthreading and is connected to said shaft for feeding movement of said shaft, a sleeve about the axis of said endwise movable member, said sleeve being normally at rest, said rotatable member and said sleeve being connected for combined endwise movements, cam means between said sleeve and a stationary part, and automatic control means to connect said sleeve with said rotatable member for rotation of said sleeve and endwise movement thereof with said nut by said cam means to react on the endwise feeding movement of said endwise movable member.

6. The combination of a work support and a tool support having feeding movement between them, and means for effecting such feeding movement including an interthreaded screw and nut constituting a pair of members one of which is rotatable and the other of which is endwise movable, a normally stationary element and a complemental element having screwlike actuating means between them for endwise movement of one of said elements, and means connecting said endwise movable element and said rotatable member for combined endwise movements of the same whereby said endwise movable element reacts upon the endwise movement of said endwise movable member to create a pause in said feeding movement.

7. The combination of a work support and a tool support having feeding movement between them, a rotatable member having operative connection with one of said supports for rotating the same to provide cutting movement between the tool and the work, and means for effecting such feeding movement including an interthreaded screw and nut constituting a pair of elements one of which is rotatable and the other of which is endwise movable, a normally stationary element and a complemental element having screwlike actuating means between them for endwise movement of one of said elements, and means connecting said endwise movable element and said rotatable member of said pair of members for combined endwise movements of the same whereby said endwise movable element reacts upon the endwise movement of said endwise movable member to create a pause in said feeding movement for run-out of the tool, and means for automatically arresting such cutting movement during such run-out of the tool.

8. The combination of a work support and a tool support having feeding movement between them, and means for effecting such movement including a rotatable nut, an endwise feedable screw threaded therein, a normally stationary rotative element provided with a cam, a stationarily positioned coactive cam member, an end thrust bearing between said rotative element and said nut, means to rotate said rotative element for combined rotative movements of the rotative element and said nut whereby said rotative element by reason of said cam means reacts upon the endwise movement of said endwise feedable screw for creating a pause in said feeding movement.

9. The combination of a work support and a tool support having feeding movement between them, and means for effecting such movement including an interthreaded screw and nut constituting a pair of members one of which is rotatable and the other of which is endwise movable, driving means for rotating said rotatable member, a normally stationary element and a complemental element having screwlike actuating means between them for endwise movement of one of said elements, and means connecting said endwise movable element and said rotatable member for combined endwise movements of the same whereby said endwise movable element reacts upon the endwise movement of said endwise movable member to create a pause in said feeding movement, reverse quick traverse means for said rotatable member, and tripping means for relief of said driving means and actuation of said reverse quick traverse means actuated by such endwise movement of said endwise movable element.

10. The combination of a work support and a tool support having feeding movement between them and means for effecting such movement including an interthreaded screw and nut constituting a pair of members one of which is rotatable and the other of which is endwise movable, a pair of complemental elements having screwlike actuating means between them for endwise movement of one of said elements, and an end thrust bearing between said endwise movable element and said rotatable member to connect the same for endwise movement of said rotatable member upon endwise movement of said endwise movable element to react upon the endwise movement of said endwise movable member for moving said endwise movable member opposite to the direction of its said feeding movement.

11. The combination of a work support and a tool support having feeding movement between them and means for effecting such movement including an endwise movable screw rod, a rotatable nut threaded thereto, a normally stationary rotatable member, an end thrust bearing between the latter and said nut, an element complemental to said normally stationary element, and screwlike actuating means between the same, for moving said rotatable nut endwise to react on the feeding movement of said screw rod for creating a dwell at the end of said feeding movement for relieving cutting pressure between the tool and the work for proper run-out of the tool at the end of the cut.

12. The combination of a work support and a tool support having feeding movement between them, and means for effecting such movement including an endwise movable threaded feed shaft, a rotatable nut threaded thereto, a normally stationary rotatable member, an end thrust bearing between the latter and said nut, an intermediate rotatable shiftable member between said nut and said normally stationary rotative element rotatable with said nut, connecting means between said shiftable member and said normally stationary rotatable member for rotating the same in unison, and shifting means for said shiftable element arranged to be actuated proximate to the end of the feeding movement of said threaded shaft for reacting on said feeding movement to reduce the pressure between the tool and the work at the end of said feeding movement for proper run-out of the tool at the end of the cut.

13. The combination of a work support and a tool support having feeding movement between them, and means for effecting such movement including an endwise movable threaded feed shaft, a rotatable nut threaded thereto, driving means for rotating said nut in feeding direction, a normally stationary rotatable member, an end thrust bearing between the latter and said nut, an intermediate rotatable shiftable member between said nut and said normally stationary rotative element rotatable with said nut, connecting means between said shiftable member and said normally stationary rotatable member for rotating the same in unison, means to move said rotatable member endwise during such rotation, to reduce the pressure between the tool and the work at the end of said feeding movement for proper run-out of the tool at the end of the cut, reverse quick traverse means for said nut, and tripping means for relief of said driving means and actuation of said reverse quick traverse means actuated by such endwise movement of said rotatable member.

14. The combination of a work support, a tool support, actuating means for movement between said supports, feeding means for feeding movements of said actuating means, forward and reverse quick traverse means for said actuating means for forward and reverse quick traverse movements of the same, manual tripping means for placing said feeding means and said quick traverse means in operative relation with said actuating means for sequential forward quick traverse movement and feeding movement between said supports, means reducing the speed of feed of said feeding means at the end of said feeding movement for providing a dwell in the movement between said tool supports for run-out between the tool and the work, and sequentially for initiating reverse quick traverse between said supports, means terminating said reverse quick traverse between said supports, to complete a cycle of movements between said supports in performing a cutting operation, and holding means to hold said feeding means in inactive relation.

15. The combination of a main electric motor for feeding movement between a work support and a tool support, a reversible quick traverse electric motor, manual switch means for energizing said main electric motor and said reversible quick traverse electric motor in forward direction for forward quick traverse movement between said supports, switch means actuated by a part concerned in such forward quick traverse movement between said supports deenergizing said reversible quick traverse electric motor in forward direction and making the feeding movement between said supports by said main electric motor effective, means for feed reduction between said supports at the end of said feeding movement for run-out of the tool, switch means, a part having operative connection with said feed reduction means for operating said last-named switch means for deenergizing said main electric motor for stoppage of said feeding movement and for initiating reverse traverse of said reversible quick traverse electric motor, and switch means and a part having operative connection in said reverse traverse for operating said last-named switch means for deenergizing said reversible quick traverse electric motor at the end of said reverse traverse movement between said supports, in performing a cutting cycle.

16. The combination of a main electric motor for feeding movement between a work support and a tool support, a reversible quick traverse electric motor, manual switch means for energizing said main electric motor and said reversible quick traverse electric motor in forward direction for forward quick traverse movement between said supports, switch means actuated by a part concerned in such forward quick traverse movement between said supports deenergizing said reversible quick traverse electric motor in forward direction and making the feeding movement between said supports by said main electric motor effective, and means for pause in said feeding movement and for stoppage of said main electric motor at the end of said feeding movement for run-out of the tool and for initiating reverse traverse of said reversible quick traverse electric motor, switch means and a part having operative connection in said reverse traverse for operating said last-named switch means for deenergizing said reversible quick traverse electric motor at the end of said reverse traverse movement between said supports, in performing a cutting cycle.

17. The combination of a work support and a tool support having feeding movement between them, and means for effecting such movement including an endwise movable screw rod, a rotatable nut threaded thereto, a normally endwise stationary element, an element complemental to said normally stationary element, and screwlike actuating means between the same having a lead substantially the same as but in opposite direction to the lead of the threading of said nut, said elements constituting a pair of elements one of which is rotatable whereby said screwlike actuating means are effective for moving said rotatable nut endwise to substantially nullify the feeding movement of said screw rod for creating a dwell in said feeding movement.

18. The combination of a work support and a tool support having feeding movement between them, a rotatable member for cutting movement between the work and the tool, and means for effecting such feeding movement including an endwise movable screw rod, a rotatable nut threaded thereto, a normally endwise stationary rotatable member, an element complemental to said normally stationary element, screwlike actuating means between the same having a lead substantially the same as but in opposite direction to the lead of the threading of said nut, said elements constituting a pair of elements one of which is rotatable whereby said screwlike actuating means are effective for moving said rotatable nut endwise to substantially nullify the feeding movement of said screw rod for creating a dwell in said feeding movement, and means for stoppage of said cutting movement during rotation of said rotatable element.

19. The combination of a work support and a tool support having feeding movement between them, a rotatable member for cutting movement between the work and the tool, and means for effecting such feeding movement including an interthreaded screw and nut constituting a pair of members one of which is rotatable and the other of which is endwise movable, a rotatable element and a complemental element having cam actuating means between them for endwise movement of one of said elements, endwise moving means between the latter and one of said first-named members, said actuating means including a cam the beginning portion of which is of less lead than and in opposite direction to the lead of the thread between said screw and said nut, and an additional portion of which is substantially the same as and in opposite direction to the lead of said thread, and means for rotating said rotatable element, for first reducing said feeding movement and then causing a substantial pause therein.

20. The combination of a work support and a tool support having feeding movement between them, a rotatable member for cutting movement between the work and the tool, and means for effecting such feeding movement including an interthreaded screw and nut constituting a pair of members one of which is rotatable and the other of which is endwise movable, a rotatable element and a complemental element having cam actuating means between them for endwise movement of one of said elements, endwise moving means between the latter and one of said first-named members, said cam actuating means including a cam the beginning portion of which is of less lead than and in opposite direction to the lead of the thread between said screw and said nut, and an additional portion of which is substantially the same lead as and in opposite direction to the lead of said thread, and means for rotating said rotatable element, for first reducing said feeding movement and then causing a substantial pause therein, said means for rotating said rotatable element including clutch means between said rotatable member and said rotatable element comprising engaging parts and a space through which an engaging part moves for relating the angular portions of said cam and said thread.

21. The combination of a work support and a tool support having feeding movement between them, a rotatable member for cutting movement between the work and the tool, and means for effecting such feeding movement including an interthreaded screw and nut constituting a pair of members one of which is rotatable and the other of which is endwise movable, a rotatable element and a complemental element having cam actuating means between them for endwise movement of one of said elements, endwise moving means between the latter and one of said first-named members, said cam actuating means including a cam the beginning portion of which is of less lead than and in opposite direction to the lead of the thread between said screw and nut, and an additional portion of which is of substantially the same lead as and in opposite direction to the lead of said thread, and means for rotating said rotatable element, for first reducing said feeding movement and then causing a substantial pause therein, said means for rotating said rotatable element including clutch means between said rotatable member and said rotatable element comprising engaging parts and a space through which an engaging part mentioned moves for relating the angular portions of said cam and said thread, a drive for said feeding movement between said supports, reverse rapid traverse means for reverse rapid traverse between said supports, means for stopping said drive adjacent to the end of said feeding movement, means for stoppage of rotation of said rotatable member, and means for initiating actuation of said reverse rapid traverse means during stoppage of said rotatable member.

22. The combination of an axially movable shaft having connection with a support for moving the same, a rotatable nut, a screw threaded therein having operative connection with said shaft, feed actuating means for said nut, a quick traverse electric motor having operative connection with said nut for forward traverse movement of said shaft, a control switch for the latter, said screw provided with a tappet, a switch control part actuated thereby for deenergizing said motor by movement of said screw in one direction, and adjusting means for adjusting the moment of coaction between said tappet and said part, said coaction by movement of said screw in the opposite direction resetting said switch.

23. The combination of an axially movable shaft having connection with a support for moving the same, a rotatable nut, a screw threaded therein having operative connection with said shaft, feed actuating means for said nut, a quick traverse electric motor having operative connection with said nut for forward traverse movement of said shaft, a control switch for the latter, said screw provided with a tappet, a switch control part actuated thereby for deenergizing said motor by movement of said screw in one direction, adjusting means for adjusting the moment of coaction between said tappet and said part, said coaction by movement of said screw in the opposite direction resetting said switch, and a buffer for said screw for cushioning said screw at the end of said last-named movement.

24. The combination of an axially movable shaft having connection with a support for moving the same, a rotatable nut, a screw threaded therein having operative connection with said shaft, feed actuating means for said nut, a quick traverse electric motor having operative connection with said nut for forward traverse movement of said shaft, a control switch for the latter, said screw provided with a tappet, a switch control part actuated thereby for deenergizing said motor by movement of said screw in one direction, adjusting means for adjusting the moment of coaction between said tappet and said part, said coaction by movement of said screw in the opposite direction resetting said switch, a buffer for said screw for cushioning said screw at the end of said last-named movement, and an adjustable member on said screw coacting with said buffer and said switch control part.

25. In a lathe, the combination of a bed, a carriage movable lengthwise of said bed, a tool slide movable crosswise of said carriage, said carriage and said tool slide constituting a pair of slidable elements, a slide between said elements, said last-named slide having slide connection lengthwise of said carriage with one of said elements and cam connection slanting crosswise of said carriage with the other of said elements, a shaft extending lengthwise of the bed, said shaft having operative connection with said last-named slide for lengthwise movement of said last-named slide lengthwise of the bed for such cross movement of said tool slide, abutment means between a part having such lengthwise movement and said carriage for combined movement of said carriage and said tool slide lengthwise of said bed, feeding means and quick traversing means for said shaft, and automatic control means comprising parts of said feeding means and quick traversing means for transitions between feeding and quick traversing of said shaft.

26. In a lathe, the combination of a bed, a carriage movable lengthwise of said bed, a tool slide movable crosswise of said carriage, said carriage and said tool slide constituting a pair of slidable elements, a slide between said elements, said last-named slide having slide connection lengthwise of said carriage with one of said elements and cam connection slanting crosswise of said carriage with the other of said elements, a shaft extending lengthwise of the bed, said shaft having operative connection with said last-named slide, for lengthwise movement of said last-named slide lengthwise of the bed for such cross movement of said tool slide, abutment means between a part having such lengthwise movement and said carriage for combined movement of said carriage and tool slide lengthwise of said bed, a plurality of operating means respectively for feeding and for quick traversing speeds of said shaft, and means to selectively operatively connect said plurality of operating means with said shaft for selective feeding and traversing movements of said carriage and said tool slide.

27. In a lathe, the combination of a bed, a carriage slidable lengthwise thereon, a tool slide slidable crosswise on said carriage, a plate having cam connection with said tool slide for cross movement of said tool slide on said carriage, a nut secured thereto, a normally non-rotatable screw threaded thereto, a second screw having releasable connection with the latter, a rotatable nut having threaded connection with said second-named screw, feeding means and quick traverse means for said last-named nut, and means whereby to rotate said first-named screw for positioning the path of sliding movement of said carriage lengthwise on said bed.

28. In a lathe, the combination with the bed, carriage and tool slide, of work rotating means, a shaft, feed gearing therefor, a reversible quick traverse means for said shaft, a slide with which said shaft has operative connection to move said slide lengthwise of said carriage, said slide having cam connection with said tool slide slanting crosswise of said carriage and spaced abutment connection with said carriage in each direction of movement of said shaft for sequential movements of said tool slide and said carriage, automatic latching means between said second-named slide and said carriage for combined feeding movements of said tool slide and carriage, and automatic releasing means for the latter.

29. In a lathe, the combination with the bed, carriage and tool slide, of work rotating means, a shaft, feed gearing therefor, a reversible quick traverse electric motor for said shaft, means whereby said motor controls shaft movement while rotating in either direction, a slide with which said shaft has operative connection to move said slide lengthwise of said carriage, said second-named slide having cam connection with said tool slide slanting crosswise of said carriage and spaced abutment connection with said carriage in each direction of movement of said shaft for sequential movements of said tool slide and said carriage, and automatic latching means between said carriage and said bed for movements of said second-named slide on said carriage, and automatic releasing means for the latter.

30. The combination of a work support, a tool support, a train of feeding means and a train of quick traverse means respectively for feeding movement and quick traverse movements between said supports, and connecting means and automatic disconnecting means automatically interrupting said connecting means, said connecting means and automatic disconnecting means being parts of said respective trains, which trains comprise a rotatable longitudinally movable element on which portions of said connecting means and said automatic disconnecting means are located, a gear on the outer periphery of said rotatable longitudinally movable element between said portions and rotatable with said longitudinally movable element, said gear being a part of said respective trains to communicate motion between said supports, and said automatic disconnecting means operated by preponderance of speed in one of said trains to disconnect said connecting means for selective feeding and quick traversing movements between said supports.

31. The combination of a work support, a tool support, a train of feeding means and a train of quick traverse means respectively for feeding movement and quick traverse movements between said supports, and connecting means and automatic disconnecting cam means automatically interrupting said connecting means, said connecting means and automatic disconnecting means being parts of said respective trains, which trains comprise a rotatable longitudinally movable element on which portions of said connecting means and said automatic disconnecting cam means are located, a gear on the outer periphery of said rotatable longitudinally movable element between said portions and rotatable with said longitudinally movable element, said gear being a part of said respective trains to communicate motion between said supports, means to normally engage said connecting means, said automatic disconnecting means operated by preponderance of speed in one of said trains to disconnect said connecting means, respectively for feeding movement and for quick traverse movements between said supports.

32. In a lathe, the combination of a bed, a carriage slidable lengthwise thereon, a tool slide slidable crosswise on said carriage, means between said carriage and said tool slide for cross movement of said tool slide on said carriage, a nut on said carriage, a normally non-rotatable screw threaded thereto, a second screw having releasable connection with the latter, a rotatable nut having threaded connection with said second-named screw, feeding means and quick traverse means for said second-named nut, and means whereby to rotate said first-named screw relatively to said second-named screw upon release in said releasable connection for positioning said carriage lengthwise on said bed.

33. The combination of a work support, a tool support, a train of feeding means and a train of quick traverse means respectively for feeding movement and for quick traverse movements between said supports, said train of feeding means including interruptable connecting means to interrupt the feeding movement between said supports, said train of quick traverse means including continuous but shiftable connecting means, a rotatable longitudinally movable element on which portions of both said connecting means are located, a gear on the outer periphery of said rotatable longitudinally movable element between said portions which is part of both said trains and is rotatable with said rotatable longitudinally movable element in each of said trains, said shiftable connecting means operated by preponderance of speed of said shiftable connecting means over said interruptable connecting means, said shiftable connecting means operatively connected with said interruptable connecting means to interrupt said feeding movement by such preponderance of speed, and driving means for said respective trains.

FRANK A. FRITZSCH.